United States Patent
Voisin et al.

(10) Patent No.: US 12,008,058 B2
(45) Date of Patent: Jun. 11, 2024

(54) CLASSIFYING RELEVANCE OF NATURAL LANGUAGE TEXT FOR TOPIC-BASED NOTIFICATIONS

(71) Applicant: OUR FUTURE UNIVERSE, Marseilles (FR)

(72) Inventors: Céline Voisin, Marseilles (FR); Jean Philippe Tissier-Seta, Marseilles (FR); Jérôme Tiollier, Marseilles (FR); Jérôme Marino, Marseilles (FR); Ana Maria Leon Ortiz, Gémenos (FR); Elisabetta Caschera, Aix en Provence (FR); Sabine Nasr, Marseilles (FR); Thomas Gerbaud, Coudoux (FR)

(73) Assignee: OUR FUTURE UNIVERSE, Marseilles (FR)

( * ) Notice: Subject to any disclaimer, the term of this patent is extended or adjusted under 35 U.S.C. 154(b) by 63 days.

(21) Appl. No.: 17/744,327

(22) Filed: May 13, 2022

(65) Prior Publication Data

US 2022/0365993 A1 Nov. 17, 2022

Related U.S. Application Data

(60) Provisional application No. 63/188,626, filed on May 14, 2021.

(51) Int. Cl.
*G06F 16/00* (2019.01)
*G06F 16/9535* (2019.01)
*G06F 18/21* (2023.01)
*G06F 18/214* (2023.01)
*G06F 40/205* (2020.01)

(52) U.S. Cl.
CPC ........ *G06F 16/9535* (2019.01); *G06F 18/214* (2023.01); *G06F 18/217* (2023.01); *G06F 40/205* (2020.01)

(58) Field of Classification Search
CPC .... G06F 18/214; G06F 16/9535; G06F 40/30; G06F 40/205; G06F 18/217; G06F 21/10; G06F 40/284; G06F 40/216; G06F 40/226; G06F 16/3329; G06F 16/353; G06F 18/00; G06Q 50/01; G06Q 50/00; H04L 67/146; G06N 20/00
See application file for complete search history.

(56) References Cited

U.S. PATENT DOCUMENTS

2020/0125639 A1* 4/2020 Doyle .................... G06F 40/30
2020/0126533 A1* 4/2020 Doyle .................. G10L 15/063

* cited by examiner

*Primary Examiner* — Yicun Wu
(74) *Attorney, Agent, or Firm* — Pillsbury Winthrop Shaw Pittman LLP

(57) ABSTRACT

Aspects of the disclosure include a natural language processing model by which topics of interest within a text are identified, such as by a predictive model that infers (e.g., based on scores associated with a text) a topic of interest associated with the text. The computer system may train or configure the prediction model, such as a machine learning model, to facilitate identification of topics of interest based on inputs, like one or more chunks of text, such as by keywords or phrases or combinations of keywords and associated metrics for nearness or frequency. The computer system may determine a measure of predicted impactfulness of the content item in relation to a topic of interest identified for the content item and determine whether to generate a notification transmitted to client devices of users having indicated the topic as of interest.

25 Claims, 6 Drawing Sheets

CLASSIFYING RELEVANCE OF NATURAL LANGUAGE TEXT FOR TOPIC-BASED NOTIFICATIONS

CROSS-REFERENCE TO RELATED APPLICATIONS

This application claims priority to U.S. Provisional Patent Application No. 63/188,626, filed May 14, 2021, the entire content of which is incorporated herein by reference in its entirety.

BACKGROUND

1. Field

The present disclosure relates to computer modeling for topic-specific notifications, for example, a machine learning model including a natural language processing component model detects topics associated with content items from natural language text descriptors and determines a relevance of content items to a topic for generating notifications.

2. Description of the Related Art

Existing computer systems for indexing content items work well in some domains, but are deficient in others. Many companies index content items. Canonical examples include indexes of webpages that support keyword based web-searches and other domain-specific indexes (e.g., news, legal, medical, technical, etc.) that support keyword based searches. Those indexes are apt to ranking content items within a particular domain based on domain-specific factors like keyword association, popularity, and recentness. Search for content items based on domain-specific factors within a domain-specific index is effective because users expect differentiation in ranking of content items that are returned in search results based on those very same factors.

In contrast, indexing across domains is more challenging. The multi-dimensional factors of each domain are difficult to coherently balance for presentation to users in rankings for naïve user search strategies. This increases search difficulty and increases return of irrelevant content items relative to domain-specific indexes. As a result, users often opt to rely on manual search within a domain-specific index that represents, in the user's view, the best-fit to finding desired content even when it means neglecting potentially relevant content within other domains. In either instance, users are burdened with the cognitive load of tinkering with keywords and other factors (e.g., various other filters in addition to keywords) in their attempts to obtain search results containing a desired content item—which the user expects to find in (and thus does not typically look beyond) the top-ranked content items. These and other drawbacks exist to providing a richer experience to users.

SUMMARY OF EXAMPLE CLAIMABLE SUBJECT MATTER

The following is a non-exhaustive listing of some aspects of the present techniques. These and other aspects are described in the following disclosure.

In one aspect, disclosed processes may generate topic-relevant notifications based on topics of interest detected within content items by natural language processing, the process configured to identify, from a plurality of sources for respective pluralities of content items, initial content item information for the content items; apply, based on a source and an identified content item, at least one filter to initial content item information to determine whether the identified content item exceeds a threshold likelihood of being potentially relevant to one or more of a plurality of topics of interest; obtain, in response to determining the content item is potentially relevant to at least one of the plurality of topics of interest, additional content item information for the content item from the source of the content item based on at least some of the initial content item information; construct a content item record comprising natural language texts parsed from the initial and the additional content item information for a plurality of different information sub-types, a given portion of natural language text being parsed from content item information for a given one of the information sub-types based on detection of one or more corresponding sub-type identifiers within the content item information; provide the content item record to a natural language processing model, wherein the natural language processing model is configured to: identify a topic interest for the content item record based on distances between chunks of natural language text within the content item record to chunks of natural language text indicative of at least one respective topic of interest, and score the identified topic of interest based on at least some of the distances, the at least some distances corresponding to chunks of natural language text indicative of at least the identified topic of interest; detect, in association with at least one information sub-type populated for the content item record, a chunk of natural language text associated with value indicative of a score of the detected chunk of natural language text relative to other possible chunks of natural language text having respectively associated values for the information sub-type; generate, in response to the score of the identified topic of interest exceeding a threshold indicative of content-topic relevance and the score of the detected chunk of natural language text exceeding a threshold indicative of impact on the identified topic of interest, a notification indicative of the content item and the identified topic of interest; and transmit the notification to a plurality of client devices based on received selections of the users of the client devices being indicative of interest in the identified topic of interest.

In another aspect, disclosed processes may generate topic-relevant notifications, an example of which may comprise obtaining training data comprising at least some training records of content items comprising natural language text and topics of interest, wherein: each training content item record associated with at least one topic and at least some portions of natural language text within different information sub-types of the training content item record being associated with the at least one topic; and each of the topics of interest are associated with a plurality of other portions of natural language text; training on the training data, with one or more natural language processing algorithms, to generate a natural language processing model configured to provide an output indicative of whether a topic relates to an input content item record based on portions of natural language text for different information sub-types within the input content item record; obtaining a plurality of input content item records based on respective content item information ingested from at least one source of content item information; processing, with the natural language processing model, the plurality of input content item records to determine, for each input content item record, a score for at least one topic based on natural language text obtained from ingested content item information for different information sub-types of the content item record; selecting a subset of the input content item records that have a same determined topic responsive to the determined scores; determining, for each of the input content item records in the subset, a score indicative of predicted impact on the topic of interest, wherein determining a score indicative of a predicated impact of an input content item record on the topic comprises: detecting, for at least some information sub-types having respective information within the input content item record, at least one key respectively associated with at least one value, scoring each key detected for an information sub-type based on the at least one respectively associated value based on values of other keys associated with the information sub-type in other records within the subset, and determining the score indicative of the predicted impact of the input content item record based on a weighted combination of the scores for the detected keys and the determined score for the topic for the input content item record; selecting one or more input content item records from the subset of input content item records based on their respective rank within the subset in accordance with their respective scores indicative of predicted impact on the topic; and transmitting a notification based on the one or more selected input content items to client devices of user-subscribers to the topic.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
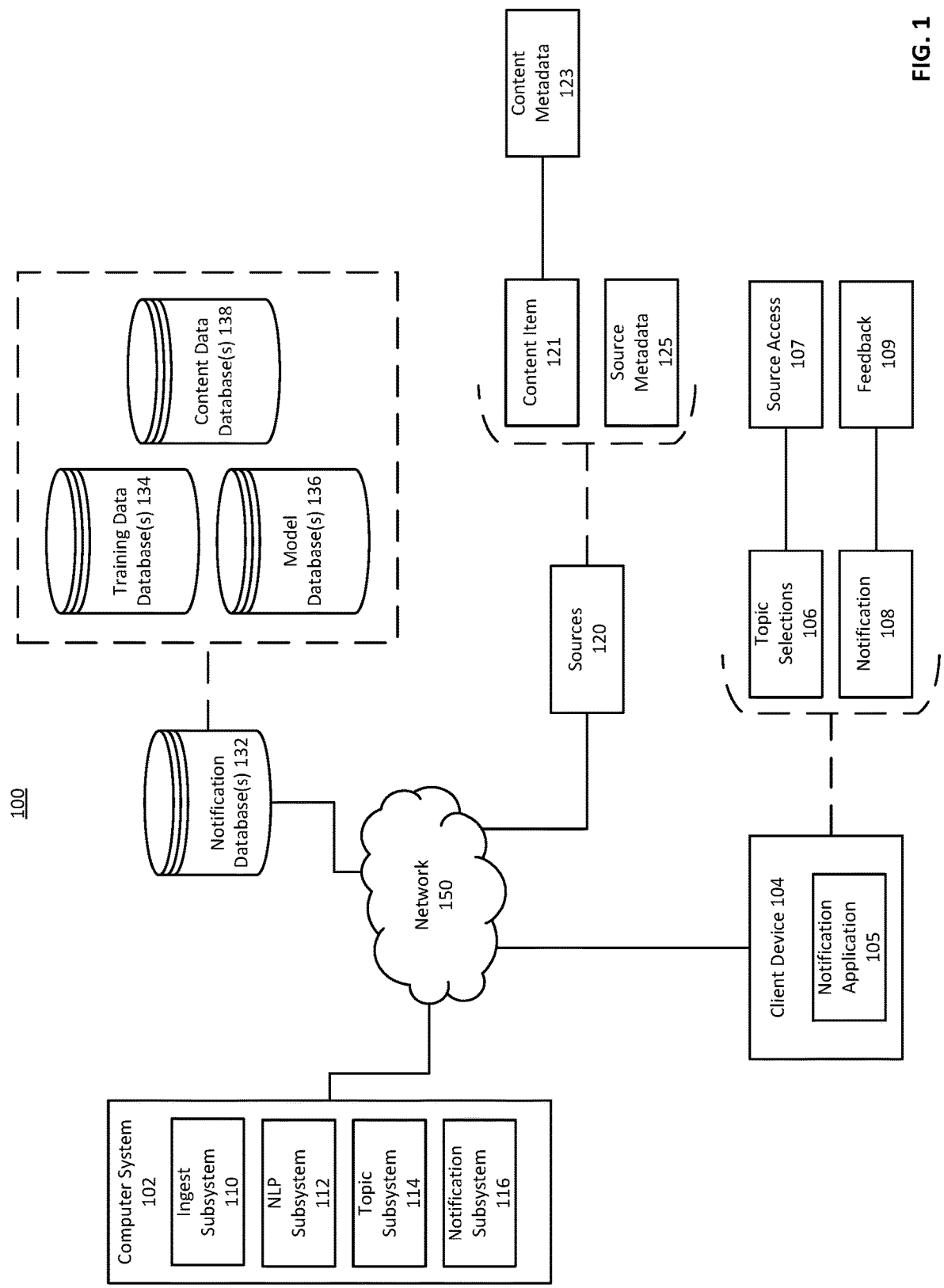
FIG. 1 illustrates an example of a computing environment within which the present techniques may be implemented, in accordance with one or more embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of machine learning, natural language processing, and human-computer interaction. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Complex operations, like machine learning, natural language processing, and other more complex computations can simplify identification of content items relevant to a topic across different domains characterized by multi-dimensional domain-specific factors. Embodiments may generate topic relevant notifications based on information (e.g., content items) within various topical categories for which relevant informational content spans multiple domains. In an example use case, such as with respect to biomedical professionals and biomedical information users, research papers, market analysis or reports, news media content, and other media content (e.g., podcasts, video content, etc.), together contain category relevant content that touches on various topics of interest with the biomedical community. These disparate sources, in many cases, also contain a multitude of content relevant to other categories (or across multiple categories) and further, to different topics of interest within each category. Continuing with the example category of biomedicine and constituent topics of interest to such communities, the different sources of content items are often domain specific and characterized by multi-dimensional domain specific factors. For example, to fully address problems with biomedical infobesity, it is desirable to couple a domain like slow journalism (e.g., including publication of research and the like) with other informational domains. Another example domain may include patent publications, whether pending or issued, which may be obtained from a database, website, or other repository. The content items within these different domains often lag relative to each other within a domain and across domains to different degrees, which presents difficulties to contextual relevant review of a topic of interest when relevant content items exist across multiple domains.

Example topics of interest with a biomedical category, like different reference universes, might include topics such as immuno-oncology, virology, vascular pathologies, infectious diseases, and the like. A given topic of interest within the biomedical category may be best understood from different angles: the laboratory, the clinic, the market, the news media, and other media. However, as noted above, for a content item associated with a topic of interest in one domain, contextually relevant information may be difficult to identify in content items across other domains. By extensions, it is also difficult to identify a set of contextually relevant content items across different domains with respect to a topic of interest. Embodiments disclosed herein serve to identify sets of contextually relevant content items, e.g., to each other, and with respect to a topic of interest. A notification, like a digest, may be generated for a topic of interest and include notification information based on information from a set of contextually relevant content items. Natural language processing and other machine learning techniques may be applied to identify sets of contextually relevant content items, determine whether the generate a notification with respect to a topic of interest for a set of contented items, and determine the notification information to include in those notifications. Notifications generated in this manner are expected to provide a deeper analysis of topics of interests. For example, important issues in biomedicine for specialists and non-specialists alike may be presented within the context of scientific, technological, medical, socio-economic and cultural impacts. Other categories, and especially those evolving categories characterized by advances in research relevant to real-world challenges or issues, such as computer technology, environmental technology, and the like exhibit many similar characteristics and are considered pertinent to applications of natural language processing and other machine learning technique disclosed herein.

FIG. 1 illustrates an example environment 100 within which an improved form of notifications for topics of interest, such as within a given category of topics, or multiple such categories having respective topics of interest may be implemented. Disclosed systems and techniques configured to generate notifications for a topic of interest are expected to impose a lower-cognitive load than traditional search and richer, cross-domain, notification information relative to traditional computer-implemented feed services (e.g., like Really Simply Syndication feeds). Some embodiments may ingest various content items (e.g., more than 100, or more than 1000, or tens of thousands or more) from disparate sources (e.g., more than 2, or more than 5, or more than 10, or hundreds or thousands or more) of content where at least some disparate sources correspond to different content-type domains (e.g., scholarly articles or research journals, other published lab results or studies, market analysis, podcasts, news media sources, video hosting sources, audio hosting services, and the like), determine relationships between ingested content items, such as to a topic of interest, and generate a notification for the topic of interest based on informational content of those content items and other factors. Some embodiments may determine to generate a notification for a topic of interest based on predictions of impactfulness of a set (e.g., like a subset) of content items (e.g., determined to be related and collectively relevant in combination) to the topic of interest in accordance with analysis of informational content within individual and among the collection(s) of content items associated with the topic of interest, and some embodiments may afford a user interface by which feedback on generated notifications and the notification information therein may be provided to adjust notification generation (e.g., by iterative model training processes utilizing received feedback signals) with relatively little effort from users. For example, some embodiments may re-train one or more models by which sets of related content items are formed, predictions of impactfulness for a set of content items are made, and notification information from a set of content items is determined based on such feedback. Some embodiments may further optimize notifications within constraints of various modes of delivery. These and other features are described in greater detail below with reference to various example implementations.

As shown in FIG. 1, the environment 100 may include computer system 102, client devices (such as example client device 104), or other components. For example, some example environments 100 may include a notification database 132, like that illustrated, which may store data utilized or determined by various other illustrated components, such as the computer system 102, and sources (such example source 120) for content items. Various ones of the illustrated components may communicate over a network 150 (which is not to suggest that a given component must communicate or be able to communicate with each other component), and the network 150 may include various private networks and public networks, such as the Internet.

Examples of client devices 104 may be computing devices such as personal computing devices like a desktop computer or mobile devices such as mobile phones, tablets, laptops, and the like. Users may, for instance, utilize one or more client devices 104 to interact with one another, one or more servers, or other components within the environment 100, such as via the network 150. Client devices 104 may execute a native application, like a notification application 105, by which notification information received from the computer system 102 may be received and subsequently displayed to the user. In some embodiments, the notification application 105 may be configured to retrieve data based on a notification, such as content corresponding to one or more content items, like one or more content items corresponding to a set of content items from which the notification was determined. As an example, a notification for a topic of interest may identify the set of content items corresponding to the notification and include access information for respective ones of the content items, like a resource locator, such as URL, by which the content items may be accessed from a source 120 or database 132. Accordingly, in some embodiments, the notification application 105 may be operable to receive (or obtain) notifications for display and further obtain or otherwise cause the client device 104 to access a content item on which information in the notification information was based (e.g., like a reference). The notification may identify which content items are relevant to which notification information and include an associated content item score indicative of the impactfulness of the content item to the topic of interest. For example, some content items may be included in the set of content items as contextual background that frames more in-depth content items (e.g., studies, scholarly journal articles, patent publications, etc.) that lag behind publication of other content items, and some other contextual content items may be blog entries, or market reports, and the like which may be prompted by and related to an in-depth content item. The contextually relevant content items often provide a deeper contextual insight into the impactfulness of in-depth content items, but they themselves may not be impactful to the topic of interest on a content basis. Accordingly, content item scores indicative of impactfulness may indicate to a user which content items are worthy of further (e.g., individual) analysis by professionals specializing in the topic of interest beyond the analysis based thereon included in associated notification information. While one client device is shown, commercial use-cases of example disclosed computer systems 102 (which may be implemented as a collection of services running on various hosts, each executing its own server process, as part of a server-system) are expected to service more than 100 or more than 1,000 concurrent sessions with more than 10,000, more than 100,000, or more than 10 million user client devices in a userbase that is distributed geographically over more than 10,000 square kilometers, e.g., over the United States.

Disclosed embodiments of the computer system 102 may facilitate notification generation on client devices 104 for topics of interest (e.g., detected by natural language processing) to their respective users (e.g., of the above noted userbase) based on content items 121 obtained from various sources 120. Examples of content items may include items containing textual information, such as files of various formats that contain text (e.g., .txt, .doc, .pdf, etc.), webpage content (e.g., text within HTML, documents or textual information displayed within a webpage), and the like that may include (e.g., primarily) information in natural language text. In some cases, the above formats may include images, like images of text, from which natural language text may be obtained (e.g., by optical character recognition). Other examples of content items may include various items of other formats, such as audio or video files or steams, that include speech. For example, audio data (or an audio data component of a video) may be analyzed to convert spoken word to natural language text, and in some cases, such as with video, frames of the video may be analyzed to obtain natural language text. Examples of such content items may include, but are not limited to, scientific articles, both reporting original research and review or commentary on non-original research, abstracts from scientific meetings, presentations (e.g., multi-media content like audio or video thereof) from conferences or lectures, clinical trial records, specialized and general media articles, blog or social media posts (e.g., which may include various formats such as audio or video blogs from various sources like audio or video hosting services for such content), and others (e.g., public shareholder meeting notes or audio, product release presentations, etc.). Further examples may include standards publications (e.g., from various different bodies or groups), government publications (e.g., requests for comments, request for proposals, and the like), and legal publications (e.g., judgements, associated briefs, and the like).

Such content items may be retrieved for analysis from various different electronic sources 120, and in various ways, some of which may be source-specific based on policy or other factors (e.g., data type of the source domain). Examples of sources 120 from which content items (or their data) may be retrieved for analysis include, but are not limited to, various repositories of published electronic information, like scientific journals and their websites, scientific meeting websites, specialized and general media websites, blog and social media platforms, video and audio hosting services, patent publication databases or websites, and other repositories. It should be noted that for the purposes of discussion herein, retrieval may comprise obtaining at least some content item data for analysis and need not require obtaining the content item in its entirety. For example, audio data from a video stream may be processed to convert speech in the video to text and an analysis of that text may be performed with respect to the video without requiring example systems herein to maintain (e.g., store) the video stream. In some cases, various textual content items (or obtained text, e.g., as in the above video example) also need not be maintained persistently on disclosed systems, rather results of one or more analyses textual content may be stored. Thus, for example, in cases where certain content items are governed by access or distribution policies, those policies may be respected when providing notification content. Additionally, it should be noted that, although some embodiments are described herein with respect to analyzing textual data (e.g., either natively, by optical character recognition, or obtained from speech to text conversion of audio data) to detect topics of interest (e.g., via natural language processing), other techniques to detect topics of interest (e.g., via image recognition) to facilitate notification generation may be used in one or more embodiments in lieu of or in addition to detection of topics of interest via textual analysis.

Embodiments of computer system 102 may include an ingest subsystem 110, a natural language processing (NLP) subsystem 112, topic subsystem 114, notification subsystem 116, or other components. In some embodiments the computer system 102 is a server-system in a client-server based architecture, and the computer system 102 may scale to support tens to hundreds of thousands of client devices 104, or even millions of client devices in various commercially relevant examples. Accordingly, embodiments of the computer system 102 may include a variety of computing devices, which may be distributed geographically, and the various functions for the computer system 102 as described herein may be distributed among the different computing devices. It should be noted that, while one or more operations are described herein as being performed by particular components of computer system 102, those operations may, in some embodiments, be performed by other components of computer system 102 or other components within the environment 100. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

The computer system 102 may ingest, such as with the ingest subsystem 110, content item information from various sources 120 of content items 121, among other data utilized by the system. Examples of content items 121 and sources 120 may be those types of content items and sources outlined above. The ingest subsystem 110 may obtain textual content associated with a content item 121 from which content item records are constructed. For example, the ingest subsystem 110 may identify a content item 121 of a source 120 for processing by the computer system 102 and ingest information like content item 121 data, content metadata 123, and source metadata 125 by which a record of the content item is constructed. While the content metadata 123 and source metadata 125 A content item record may contain various information about the respective content item. A content item record may include for, or associate with a content item (e.g., by multiple associated records), natural language text associated with the content item, content metadata, and source metadata. The natural language text associated with the content item may be textual content (and other information) based on an analysis of (e.g., core) textual content obtained from the content item. Core textual content may differ depending on what textual content is obtained for the content item, like an abstract vs full text of a study or scholarly publication. In some cases, the textual content may include textual content from the content item, in whole or in part, or in some cases the content item (or resource locator for the content item from the source or within a database 132). The content metadata may include content-related data associated with a content item. Content metadata may be determined from analysis of textual content of the content item or associated with the content item, and may include, but is not limited to information like title, authorship (or inventorship in the case of patent publications), author affiliations (or assignee or filing entity in the case of patent publications), key words, abstract, subtitles, highlights or references, description, one more resource locators (e.g., like a Digital Object Identifier (DOI) or one or more uniform resource locators (URLs)), source of the content item, and dates (e.g., date of publication or availability). Source metadata may be determined from analysis of the source and other sources, and in relation to content item metadata, and may include, but is not limited to information like source statistics (e.g., indicative of research impact metrics, website usage statistics, social media impact, etc.), author statistics (e.g., indicative of author impact metrics, author impact on professional and social networks, author award history, etc.), and content affiliation statistics (e.g., indicative of on professional and social networks, etc.). The respective statistics may be determined based on website usage, user views (e.g., of content or source or authors) across one or more sources of content items, user reactions like comments or reactions (e.g., to content or source or authors) across one or more sources of content items, inclusion of content items from the source or the content itself as references by other content items, and the like.

As described above, in some embodiments, the ingest subsystem 110 may obtain text content from a content item for analysis. The ingestion subsystem 110 may obtain natural language text corresponding to a content item by accessing a webpage containing text content or accessing a file containing text content (e.g., natively within the file or web content, like HTML); accessing an image(s) or image data (e.g., from a video or presentation or the like) and obtaining text content by optical character recognition within the image(s); accessing audio data, like from a stream or file, of audio or video content, and obtaining text content by conversion of speech to text of detected spoken word within the audio data; or a combination of one or more of the aforementioned processes, such as in relation to a multi-media content item (e.g., like a webpage or presentation which may contain text, audio, and image data) or otherwise in a content item including multiple types of media. The above processes may similarly be performed to obtain source or content metadata, although, in many cases, such information may be obtained based on key-value pairings (e.g., by field or descriptor), which may be detected in relation to content items or sources, and about sources or content items or information associated therewith from other sources (e.g., like various statistics indicative of impact or authoritativeness).

Information ingested by the ingest subsystem 110, like a content item 121 and other information in relation to a content item 121 (or source of the content item) available from a source 120 (or one or more sources), such as source metadata 125 and content metadata 123 may be processed by one or more other subsystems of the computer system 102 to construct content item records and generate notifications, as is explained in greater detail below. In some cases, these other processes may call back to the ingest subsystem 110 to obtain other data in relation to a content item or content item record or a source, such as to update statistics over time or otherwise update information stored in content item records. For example, a source of a content item may update statistics relevant to ranking or access or impactfulness of the content items with respect to other content items available from the source which may be retrieved as metadata relevant to the content item (and source). One or more other sources may store other source metadata, such as statistics relevant to ranking or access or impactfulness of the source with respect to other sources from which other content items are retrieved, and in some cases the statistics may include information about link-backs or references which may be traced to a content item that was ingested from the source. In some cases, one or more such repositories may store information about various metadata fields within source or content metadata, like publication statistics, ranking of researchers or published authors within respective fields, and affiliation information for authors, sources, and research or education or industry institutions. These and other data repositories storing statistical or link-back or reference information for sources or content items from sources may generally store data that is ingested for the purposes of hierarchically ordering (or ranking) content items determined to be relevant to a topic of interest by one or more of the above metrics, as described herein, and which may be normalized across different sources and data-domain types to promote relevant content items across sources and data-domains. Thus, data contained within these one or more data repositories may be third party to sources of content items but maintain information that can be used for the purposes of determining hierarchical order (or rank) among content items for a given topic of interest, and those repositories may be accessible via an API or the like by the computer system 102 for notification generation. Examples of such repository relevant to example topics of interest within the context of medical professionals may include registries such as CROSSREF (www.crossref.org) or the MEDLINE database (www.nlm.nih.gov/bsd/pmresources.html). In some embodiments, data may be directly obtained from the one or more data repositories automatically and continuously, such as by API query in connection with a content item (e.g., based on source of the content item, DOI, authorship, etc.) selected by one or more of the processes described herein. In other embodiments, data may be obtained from the one or more data repositories and stored persistently for access from within a notification database 132 in association with a content item, source, or author, and periodically updated (e.g., to afford detection of statistical trends for content items, sources, or authors for determination of hierarchical order (or rank) among content items for a topic of interest).

In some example embodiments, the ingest subsystem 110 obtains content items and associated metadata from scientific publications as well as various specialized or general sources of content items and social media and content hosting platforms. Content items may be identified by the ingest subsystem 110 for retrieval based on RSS feed aggregation (e.g., indicating potential content items from sources), interrogation of available APIs (e.g., corresponding to source repositories of content items) and web scrapping of public data (on source websites, including but not limited to scientific editors, news website, government publications, social media, and the like). Embodiments of the ingest subsystem 110 may apply one or more filters, which may be source or data-domain specific, to filter out, at a high-level, content items unrelated to categories of topics of interest, such as to identify those content items which are potentially relevant to categories of topics of interest for ingestion. In some cases, source or domain-specific filters may be trained to score content items available from a given source or within a given domain as potentially relevant to categories of topics of interest. For example, user feedback may be received with respect to a content item included in a notification for a topic of interest within a given category, and a feedback score may be assigned to the content item based on aggregate user feedback. Feedback may also be received based on one or more processes applied by the computer system to ingested content items, such as scores indicative of whether the content item is determined to be relevant to at least one topic of interest within a category. Content items from a given source or data-domain may be selected based on one or more of the feedback scores, like a feedback score indicative of above a threshold level of relevance or impactfulness to a topic of interest, to a source specific or data-domain specific training set. In turn, a source or data-domain specific filter may be trained based on the training set, in accordance with one or more of the machine learning techniques described herein.

In some embodiments, content items obtained from a same source or having a same data-domain may be expected to share common characteristics within the information by which those content items are identified for ingestion and thus may be filtered more accurately. For example, different source feeds or APIs may describe content items in different ways (e.g., but consistently within a given feed or API), and different data-domain types may exhibit different domain-specific characteristics for filtering, such as by length in time (e.g., audio or video) or space/text content (e.g., number of pages or word count) or description or abstract descriptiveness, inclusion or lack of inclusion of related keywords or tags and their specificity or lack thereof, and within different fields (e.g., title+description, title+abstract, title+authorship, author+content, or other various combinations of possible identifiable fields) which may be identified differently across content domains and the like. In other words, different sources may utilize different schemas for reporting similar or different information in various source-specific ways and different data-domain types may have different characteristics (which in some cases may also have source specificity, like listing a raw page length or start and end pages within a publication and the like). These differences in ways different sources describe content items available from the respective sources may lead to a higher rate of false positives (or false negatives) with application of relatively unrestrictive (or too restrictive) naïve filtering process for identification of content items for processing. Similarly, naïve filtering processes may lead to a higher rate of false positives (or false negatives) for different data-domain types and thus fail to select topic-relevant content items (or over select irrelevant content items) in at least some domains. Accordingly, training of high-level filters by source or by data-domain, which may be applied (e.g., like in stages, or in parallel, to produce a combined score for source and data-domain) to score identified content items. Identified content items having a score (e.g., above a threshold) indicative of being potentially relevant to a category of topics of interest may be selected for further processing.

In some embodiments, the information by which content items are identified may be stored, such as in association with a content item record, such that when that when the content item record is selected to a training set (e.g., for one or more other machine learning processes), one or more high-level source or data-domain specific filters may also be trained. In some embodiments, a single-global filter may be trained, such as by inclusion of source (e.g., like a source identifier assigned to respective, distinct sources) or data-domain type information (e.g., like a data-domain type identifier assigned to different data types, like text (and different text types, like scholarly articles, social media or blog commentary, news coverage, etc.), audio, video, etc.) in training record information to overcome deficiencies in prior, naïve content filtering processes. Thus, for example, when a content item is identified for potential ingestion, the ingestion subsystem 110 may apply a filter (e.g., global or one or more filters selected based on source or data-domain type) to the information by which the content item is identified and determine to ingest the content item based on a score output by the filter for the identifying information.

Accordingly, the ingest system 110 may obtain content item information and other information in relation to a content item which may be processed by the computer system 102. The obtained information may be processed by the computer system 102 and results of the processing (e.g., like a content item record) and other information may be stored within a database 132, like a content data database 138. In some cases, the obtained information may be stored in association with the results of processing that information, such as to facilitate training operations of computer models, either for identification or filtering of identified content items prior to ingest, or by which other results of processing ingested information are determined.

In some embodiments, the Natural Language Processing (NLP) subsystem 112 receives information ingested for a content item from the ingest subsystem 110 or obtains a content item record including the information ingested by the ingest subsystem 110 for a content item. For example, the NLP subsystem 112 may access data pertaining to a content item from a content data database 138. Specifically, the NLP subsystem 112 may obtain textual content corresponding to the content item for generation of a structured content record. The textual content may include textual content from the content item and textual content related to the content item, such as where a content item is available from or provided in relation to a webpage including textual information about or from the content item. The NLP subsystem 112 may parse the textual information to identify or infer information sub-types within the ingested textual information for the content item, like a title, abstract or description, core text, keywords, citation or reference lists, publisher/source, and authorship. The data corresponding to respective information sub-types or combinations of information sub-types identified within the textual information may be populated consistently within a structured content record. In other words, an output of the NLP subsystem 112 with respect to the information ingested for a content item may be a structured content record of the content item. For example, if multiple information sub-types related to authorship are identified, the identified authors may be deduped or filtered (e.g., by best value, e.g., like full name rather than last and first initial) and the resulting authors populated within one or more author field(s) in a consistent format (e.g., last name, first name, middle name, title, etc.). Similarly, description or abstract (or both, such as where different), core text, and other information may be populated consistently across structured content item records. The structured content items records may be further analyzed by one or more predictive processes to infer one or more topics of interest corresponding to the content item. In turn, the compute system 102 may output a notification for a topic of interest based on one or more content items determined to correspond to a topic of interest. Content item selection for a notification may be determined based relevance and various other factors discussed herein. The notification for a topic of interest, which may include notification information corresponding to and based on the selection of content items for the notification, may be transmitted to client devices 104 of users determined to or having indicated an interest in the topic.

To that end, the computer system 102 may provide one or more identified topics of interest for a content item as feedback to a prediction model, and those identified topics of interest for a content item may also be scored based on user feedback (e.g., user responses to notifications) to notification information and content items corresponding to a given notification for a topic of interest. Example user feedback scores may be based on implicit user feedback, such as whether a user acts on, dismisses, or how the user otherwise interacts with the notification information or associated content items, or various explicit feedback as user provided responses to various feedback prompts. In cases where explicit user feedback is received, such as feedback provided as a user response to feedback prompt, a score may be determined (or a score adjusted) based on associated implicit feedback signals, like dwell time within the notification interface or upon access of an associated content item, view and access timestamps, etc. associated with the various interactions, which may be utilized to score various feedback metrics (e.g., especially explicit user feedback solicited by feedback prompts). In turn, in an iterative training process, the computer system 102 may update one or more portions of a prediction model (e.g., for detecting topics of interest) or other prediction model-based processes utilized by the computer system (e.g., ingestion filters, NLP parsers for structuring content item records, topic-based content selection predictors, and the like) based on the prediction output (and other respective prediction outputs) and feedback score. In this way, for example, the prediction model and other models utilized by the computer system 102 may be trained or configured to generate more accurate predictions based on which selected content items and notification information based thereon for a notification for a topic of interest are deemed more useful or accurate for users (e.g., like a group of users determined to or having indicated interest in the topic that received the notification) associated with respective client devices 104 participating within the computing environment 100. As such, in some embodiments, subsequent to updating a prediction model, system 102 may use an updated prediction model to not only identify topics of interest within content items but determine thresholds for generating a notification associated with a given topic of interest for selections of content items. In some embodiments, the thresholds may be indicative of whether a notification for a topic of interest should be generated (e.g., for transmission to client devices) based on an available content items (e.g., which may include new and old content items), and the which ones of the available content items are selected according to respective thresholds or rules for generating the notification.

Embodiments of client devices 104 may execute a notification application 105 by which users interact with aspects of the notification system to provide feedback. For example, the notification application 105 of a client device 104 of a given user may receive a notification 108 for a topic of interest to the given user and display associated notification information on a display of the client device. The notification application 105 may be configured to present feedback 109 selection options in association with notification information for soliciting user feedback, such as in relation to one or more content items on which the notification information is based, or otherwise identified to the user in relation to notification information. The feedback solicitation options may include prompts in natural language text based on factors by which notification information or content items were selected and measure of impactfulness for generation of the notification. Implicit feedback may be collected by the notification application 105, such as by timestamps in association with different interactions of users (e.g., selections, scrolling, etc.) via the notification application with notification information or content items accessed by the user via the notification application (e.g., such as where a browser or other element to view a content item is launched or called by the notification application).

In some embodiments, one or more users, like topic of interest curators, may be selected to provide feedback on a potential notification prior to its distribution among a wider base of users for which the topic is of interest. In some embodiments, a topic of interest curator may be selected to provide feedback on a content item for a notification or notification information with respect to the content item, and the selection may be based on source access 107 information provided by the user in relation to topic selections 106 of interest to the user. For example, if a user indicates virology (or a further refined topic of interest within the field of virology) as a selected topic of interest within topic selections 106 and access to a publication source, like the journal NATURE, the user may be selected to provide feedback on a notification for virology or further refined topic of interest within that field that is based on or includes a content item from the journal NATURE. Specifically, the notification application 105 may prompt the user to provide feedback for the notification, such as by one or more prompts specific to notification information based on the content item (e.g., after user review of the content item) or otherwise provide feedback on the content item (or information related to the content item or source) from the journal NATURE.

Some embodiments may segment a notification for curation among different ones of the topic of interest curators based on respective source access, and may provide the notification in full to others, such as to receive higher-level notification feedback and lower-level content-item focused feedback. In some embodiments, a collaborative communication path may be formed between topic of interest curators from which a given feedback component (e.g., on a content item, content items, or notification in general) is solicited, such as to provide commentary visible to the respective group from which feedback (which in this case, may be collaborative discussion) is sought. The computer system 102 may ingest topic of interest curator feedback, which may be analyzed and scored with respect to the notification, notification information, and content item selected for the notification, such as to infer one or more component measures or overall measure of notification quality. In some embodiments, one or more component quality measures, such as for a given content item selected for the notification, or corresponding notification information, may be ranked based on feedback scores for promotion, demotion, reformulation, or omission from the notification.

Some embodiments may prompt manual administer review, or invite curator consensus, for content items or notification information based on the user feedback, such as if feedback scores are above a threshold for a content item but below a threshold for notification information corresponding to the content item, or vice versa, or based on other feedback factors like indicated impactfulness or quality or relevance. Instances of manual review may be prompted for a feedback decision which may be included in records for a training set by which NLP models for analyzing feedback 109 received for notifications 108 are trained. In turn, the computer system 102, in many cases, may process curator feedback with respect to a notification and re-generate notification information without manual administer intervention. User feedback received from the broader user base for a notification may be received and processed in a similar fashion, and may identify information to records of a training set. Thus, a client device 104 of a curator/user, via the notification application 105, may be used to perform one or more user-facing functions, such as receiving a notification for a topic of interest that may include hierarchically ordered (or ranked) content items for the notification and providing feedback on the quality of the classification of a content item as relevant or otherwise impactful to the topic of interest (e.g., alone or in combination with the other content items) and the hierarchical order (or rank) of the content items to provide oversight, updating, or correction for machine learning processes implemented by the computer system.

In some embodiments, the notification application 105 may also be used by a curator/user to provide additional information, like an additional class of feedback, for ingestion by the computer system 102. For example, the notification application 105 may provide a user/curator interface by which user-scores (e.g., like user feedback scores) may be provided with respect to available content items and other information with the notification system, such as by ranking or scoring content items, authors, sources, or affiliations. In some cases, such feedback may be collected before notification generation, such as after a new content item is ingested by the computer system 102 to augment a prediction of impactfulness corresponding to the content item.

Thus, as outlined above, the computer system 102 may ingest electronic data from one or more sources (e.g., like content items and related content or source metadata), direct operation of one or more other devices (e.g., client computing devices to provide feedback on notifications and content items), collect data from one or more sources (e.g., data relating to an author's publication history, publicly available affiliation or market performance data, data from a reference management software program, etc.) and store data related to the content items and their metadata. The stored data for content items, such as stored within a notification database 132, like within a content data database 1138, may be processed by the computer system 102 to structure and select training records to training data (which may also include other training data) within a training data database 134 for training computer models, and trained computer models may be stored within a model database 136 for utilization by the computer system 102 to process content items, user feedback and related data by one or more of the models to provide notifications and the like as described herein.

The NLP subsystem 112 may analyze core text content (e.g., one or more of core text, description, or abstract) and other text content associated with a content item with natural language processing techniques disclosed herein, which may be based on predictive machine learning models trained to infer topics of interest within text content. In some embodiments, the NLP subsystem 112 analyses the text content by one or more NLP processes to construct content item records in a structured format, like in accordance with a given content item record schema. In some embodiments, the NLP subsystem 112 may construct a content item record (e.g., like a content record structured in accordance with the schema) for a content item based on ingested information received from the ingest subsystem 110. In some embodiments, the NLP subsystem 112 may construct a structured content item record or otherwise process a content item record created with respect to the content item by the ingest subsystem 110. In either instance, the NLP subsystem 112 processes text content associated with a content item to construct content item record information (e.g., in a structured format to which one or more other processes may be applied). Example embodiments of natural language processing may include a model (e.g., a natural language processing model) by which topics of interest within a text (e.g., including one or more words, phrases, sentences, or paragraphs, some of which may include or be represented by a standard encoded character combination) are identified, such as by a predictive model that infers (e.g., based on scores associated with a text) a topic of interest associated with the text. Contextual or related-topic information, like metadata, in relation to detection of a topic of interest may also be inferred from the text as described herein. In some embodiments, the computer system 102 may train or configure a prediction model, such as a machine learning model, to facilitate identification of topics of interest based on inputs, like one or more chunks of text, such as by keywords or phrases or combinations of keywords and associated metrics for nearness or frequency. In some embodiments, the NLP subsystem 112 may obtain information related to chunks of texts for identifying a topic of interest based on natural language processing of other text content, such as text content by which the prediction model is trained to identify topics of interest.

In some cases, textual content by which the natural language processing model is trained may include contextual information and information about a source from which the chunk originated, author affiliations, and the like, as described herein, such as to predict topics of interest based on additional factors in addition to core text content. Such information associated with text, and text inputs, obtained for a content item may be encoded in a data structure and provided as input to a prediction model to generate predictions (e.g., related to whether a given topic of interest can be identified from the inputs). For example, structured content item records include a number of fields containing textual information, like various core text fields, and other informational fields, like authors, title, source, references, etc. The text in other information fields may include labels that correspond to information in other records, like various records of metadata related to content item records, such as records indicating information about authors, sources, affiliations, references (e.g., which may correspond to other content item records), and the like. In turn, the NLP subsystem 112 may process the text within a number of fields to determine whether respective text likely corresponds to one or more labels for identifying other records or data for association with or population within the structured content item record. Thus, for example, supplementary contextual information may be obtained from other records by which predictions may be made. In some embodiments, the NLP subsystem 112 structure identified supplementary contextual information for processing by the NLP subsystem 112 with the structured content item record.

In some embodiments, the NLP subsystem 112 may include one or more neural networks or other machine learning models. For example, a natural language processing model may be implemented with a neural network trained to infer topics of interest associated with chunks of natural language text. As an example, neural networks may be based on a large collection of neural units (or artificial neurons). For example, in some embodiments, the NLP subsystem 112 processes a feature vector by a Neural Network (NN), which may be a Recurrent Neural Network (RNN), that comprises connections between nodes, or neural units, forming a directed graph along a temporal sequence which may transit a number of nodes and loop-back to previously transited nodes, as some nodes may comprise multiple connections to respective ones of other nodes or even a looping connection back to itself. Such connections can be enforcing or inhibitory in their effect on the activation state of connected nodes. In some embodiments, each individual node may have a summation function which combines the values of all its inputs together. In some embodiments, each connection (or a node itself) may have a threshold function such that a signal must surpass the threshold before it propagates to one or more other nodes in the network. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" nodes. In some embodiments, stimulation and inhibition for neural networks may be more free-flowing, with connections interacting in a more chaotic and complex fashion. Thus, while an input feature vector comprises content record information (and, in some cases, other information, like contextual information from other records), an output feature vector may comprise a predicted relevance between the content item and different topics. The predicted relevant of the content item to different topics may have deeper properties than keyword search alone, such as by connections formed in such networks based on author affiliations and publication history, references to other content item, and the like. Moreover, these deeper properties and predicted relevance may be reflective, and represented by looping connections between nodes. For example, different loops based on each author and associated content items in training records, like a publication history over time, may provide different relevant topic predictions based on the different entries of the input feature vector (e.g., such as where authors generally associated with different topics work together in relation to a same topic). Accordingly, the output feature vector may comprise a predicted content item-topic relevance measure for a number of different topics, as topical interests often intersects for at least some topics across disciplines.

Thus, examples of computer models, like the various machine learning models applicable within the context of the above-described environment 100, may take inputs and provide outputs. For example, a model may be fed an input or set of inputs for processing based on a request and provide an output or set of outputs. In some cases, outputs may be fed back to a machine learning model as input to train machine learning model (e.g., alone or in conjunction with user indications of the accuracy of outputs, informational sub-types associated with the inputs, or with other feedback information). A machine learning model may update its configuration (e.g., weights, biases, or other parameters) based on its assessment of its prediction (e.g., outputs) and feedback information (e.g., user indications of accuracy, reference informational sub-types, or other information). In another use case, where a machine learning model is a neural network, connection weights may be adjusted to reconcile differences between the neural network's prediction and the feedback of users. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model may be trained to generate better predictions.

Models from the model databases 136 may be trained and provided to one or more other devices or subsystems, for example, a topic subsystem 114 may utilize a same or a different model from that utilized by the NLP subsystem 112 to process one or more content items sharing a topic identification to select a set of content items for generation of a notification. In some example embodiments, different models may be utilized by the NLP subsystem 112 and the topic subsystem 114 to generate respective outputs, however, embodiments combining such respective functionality within a single model are not disclaimed. In at least some cases, it may be desirable to utilize multiple models, such as to reduce redundancy of computing at least some determinations (e.g., for resulting outputs) that are expected to exhibit less dynamics than others. Thus, for example, execution time of some models that are expected to update or determine new results more frequently may be reduced relative to embodiments utilizing a single model. For example, topic identification with respect to a content item may be expected to be relatively static (e.g., over a week or month) for an iteration, and even across iterations, of a model utilized by the NLP subsystem 112. By contrast, an impactfulness score with respect to that content item may be expected to change, drastically in some cases, over similar time periods based on more dynamic factors (e.g., based on updated statistics and other factors collected in updated content and source metadata) and it may be desirable to track such changes by recomputing such a score, like by a different model utilized by the topic subsystem 114, with a higher degree of frequency, such as prior to or in connection with notification generation for a topic identified for the content item.

Accordingly, different machine learning models may be trained by different subsystem or for different purposes. In some embodiments, inputs or outputs of the various machine learning models utilized by the various subsystems may be structured in a way that enables the feeding of one model output into another model, like in stages. For example, the NLP subsystem 112 as described above may identify topics of interest for natural language text of a content item. Other subsystems, like the topic subsystem 114, may process content items sharing a topic of interest determined by the NLP subsystem 112 to determine other information, like a predicted impactfulness of a content item among other content items to a topic of interest. Accordingly, while embodiments of functionality of the NLP subsystem 112 and the topic subsystem 114 may be implemented by a single computer model, embodiments also contemplate a tiered approach utilizing two or more computer models. For example, the NLP subsystem 112 may utilize a first computer model to output topic identification scores for content items, and the topic subsystem 114 may utilize a second computer model to output other scores which may be based in part on topic identification scores for content items, like impactfulness scores, for one or more content items sharing a topic identification, upon which selection criteria of a content item for a topic notification may be based. Thus, the NLP subsystem 112 may, for example, identify and score topics for a content item and the topic subsystem 114 may, for example, predict impactfulness of a content item with respect to a topic identified for the content item based on the topic score and other factors, like source or content item metadata and associated scores indicative of access statistics and for authors, sources, or affiliations identified for the content item. As such, in some example embodiments, the training data database 134 may store at least some training records including results output by a computer model, such as within a training record, by which the computer model and other computer models may also be trained based on the results and other data.

In some embodiments, a machine learning model may include both one or more clustering models and one or more neural networks. For example, a model may receive input data that includes natural language texts and other contextual information such as timestamps (e.g., corresponding to publication of a content item), source and content metadata, and the like. The model may then use a clustering model generated from like contextual data in training data to modify or augment the input natural language text, such as to account for associations of authors or affiliations with topics of interest or impactfulness of content items. A model may then use a neural network to predict a topic based on the input text for the content item, topics associated with other content items of authors, source or author affiliations, and other factors, or predict an impactfulness of a content item for a topic of interest based on statistics associated with other content items of the authors, source or author affiliations, and other factors.

In some embodiments, the parameters (e.g., weights, biases, neural network hyperparameters, etc.) of the neural network may be configured by way of training the neural network based on training data stored within a notification database 132. The notification database 132 may include one or more training data databases 134 containing training data, like a corpus of content item records including associated natural language text, associated metadata, and the like. The training data database 134 may also include training records which describe content item records or portions of texts within the content item records and may have a data structure corresponding to an input of chunks of natural language texts obtained from structured content item records for input into the model or output of the model based on an input of identified chunks of natural language text from content item records. The records may also indicate contextual metadata information, such as an impactfulness score, and may contain reference timestamps on which the impactfulness score or other scores, such as for selection of a content item, is based such that a model may infer temporal context from input texts. The records need not describe each text or every portion of a text. The training data and training records within the training data database 134 may be accessed by the computer system 102 to train a neural network for identification of topics of interest corresponding to a content item. A resulting neural network or other computer model may be stored within the model database 136 (e.g., as a version of an NLP model) and subsequently accessed by the NLP subsystem 112. The NLP subsystem 112 may iteratively train the neural network to update an NLP model and periodically load a new version of the NLP model from the model database 136 to process natural language texts for topic identification (e.g., content-topic scores for topics of interest predicted to be relevant to a content item by natural language texts associated with the content item). Similarly, the training data and training records within the training data database 134 may be accessed by the computer system 102 to train a neural network or other computer model for predicting an impactfulness of a content item to a topic of interest to which the content item is determined to be related. A resulting neural network or other computer model may be stored within the model database 136 (e.g., as a version of an NLP or other predication model) and subsequently accessed by the topic subsystem 114. The topic subsystem 114 may iteratively train the neural network to update an NLP or prediction model and periodically load a new version of the model from the model database 136 to process content-topic scores for topics of interest predicted to be relevant to the content item and other associated information, like statistical data pertaining to the content item, source, authorship, etc., to predict and impactfulness of the content item to one or more topics of interest.

Models, like the above prediction models which may process natural language text and other information, may be trained with various, model-appropriate, training algorithms, including Baum-Welch, gradient descent, and the like. In some embodiments, models are trained by a background offline task using one or more machine learning techniques (e.g., model-appropriate training algorithms). Some embodiments may execute a gradient descent optimization to reduce the error rate and select appropriate weighting and the bias values within a model. In some cases, a predictive model (e.g., a vector of weights) may be calculated as a batch process run periodically. For example, some models may be trained to output scores for different topics of interest to which a content item corresponds based on content items records and those output scores may be stored in association with respect content item records and some models may be trained based on output scores for content items sharing a topic of interest based on content item records having associated topic of interest scores. Embodiments may construct such models by, for example, assigning randomly selected weights or biases, calculating an error amount with which a model describes information pertaining to a content item and rates of change in that error as a function of the weights in the model in the vicinity of the current weight (e.g., a derivative, or local slope), and incrementing the weights in a downward (or error reducing) direction. In some cases, these steps may be iteratively repeated until a change in error between iterations is less than a threshold amount, indicating at least a local minimum, if not a global minimum. To mitigate the risk of local minima, some embodiments may repeat the gradient descent optimization with multiple initial random values to confirm that iterations converge on a likely global minimum error. Other embodiments may iteratively adjust other machine learning models to reduce the error function, e.g., with a greedy algorithm that optimizes for the current iteration. The resulting, trained model, e.g., a vector of weights or biases, may be stored in memory and later retrieved for application to new calculations on newly updated content item records and associated metadata information, periodically to confirm topical relevance or impactfulness measures, or proximate to generating a notification for a topic of interest to which the content item is related (e.g., to capture temporally proximate factors such as relatedness to one or more content items of initial selection for notification). In some embodiments, some or all of the weights or biases of a neural network (or other models) described herein may be calculated by executing a machine learning algorithm on a training set of content item records deemed related/unrelated to one or more topics of interest in seeded content item records. As users engage with the notification service, seeded content records may be updated based on feedback received from users on content items included in notifications, predictions of relevance between content items and topics of interest, and tracked statistics indicative of impactfulness of content items. In turn, as feedback is received (e.g., based on whether a content item is pertinent to a topic of interest) or content item records are otherwise updated (e.g., based on statistical measures indicative of growing impactfulness of a content item), a model may be retrained based on an updated set of content item records and associated information. Additionally, as noted above, filters for ingest of content items may be employed, and those filters may similarly be retrained based on an updated set of content item records, such as by retaining raw data (e.g., in a schema of the source by which the content item was identified) in association with respective content item records for training a filter to be applied to identified content items available from a source (e.g., like a source specific filter) or sources based on whether the content item was deemed pertinent to a topic of interest for notification generation.

The notification subsystem 116 may generate a notification (e.g., for a topic of interest) based on results of processing ingested content item information. In some cases, the notification subsystem 116 may determine to generate a notification for a topic of interest based on topic-content item scores that indicate a relatedness of the topic of interest to various ones of content items represented in respective content item records. In some cases, the notification subsystem 116 may determine to generate a notification for a topic of interest based on impactfulness scores that indicate a predicted impactfulness of a content item to the topic of interest. In some cases, the notification subsystem 116 may determine to generate a notification for a topic of interest based one or more scores, like one or more of the above noted scores, and other information, such as a notification history corresponding to the topic of interest indicating content items upon which prior notifications for the topic of interest were based. In some embodiments, the notification subsystem 116 may determine to generate a notification for a topic of interest based on an aggregate score, like a rank, of a content item (or items) associated with the topic of interest. For example, the notification subsystem 116 may determined to generate a notification for a topic of interest when a content item associated with the topic of interest has a rank above a threshold rank or when a set of content items associated with the topic of interest respectively have ranks above one or more threshold ranks. In some embodiments, the notification subsystem 116 may select, after selecting a first content item for a notification, one or more other content items based on scores indicative of relatedness of those content items to the first content item. Examples of the above and other determinations are discussed in greater detail with reference to the following figures.

Figure 2A:
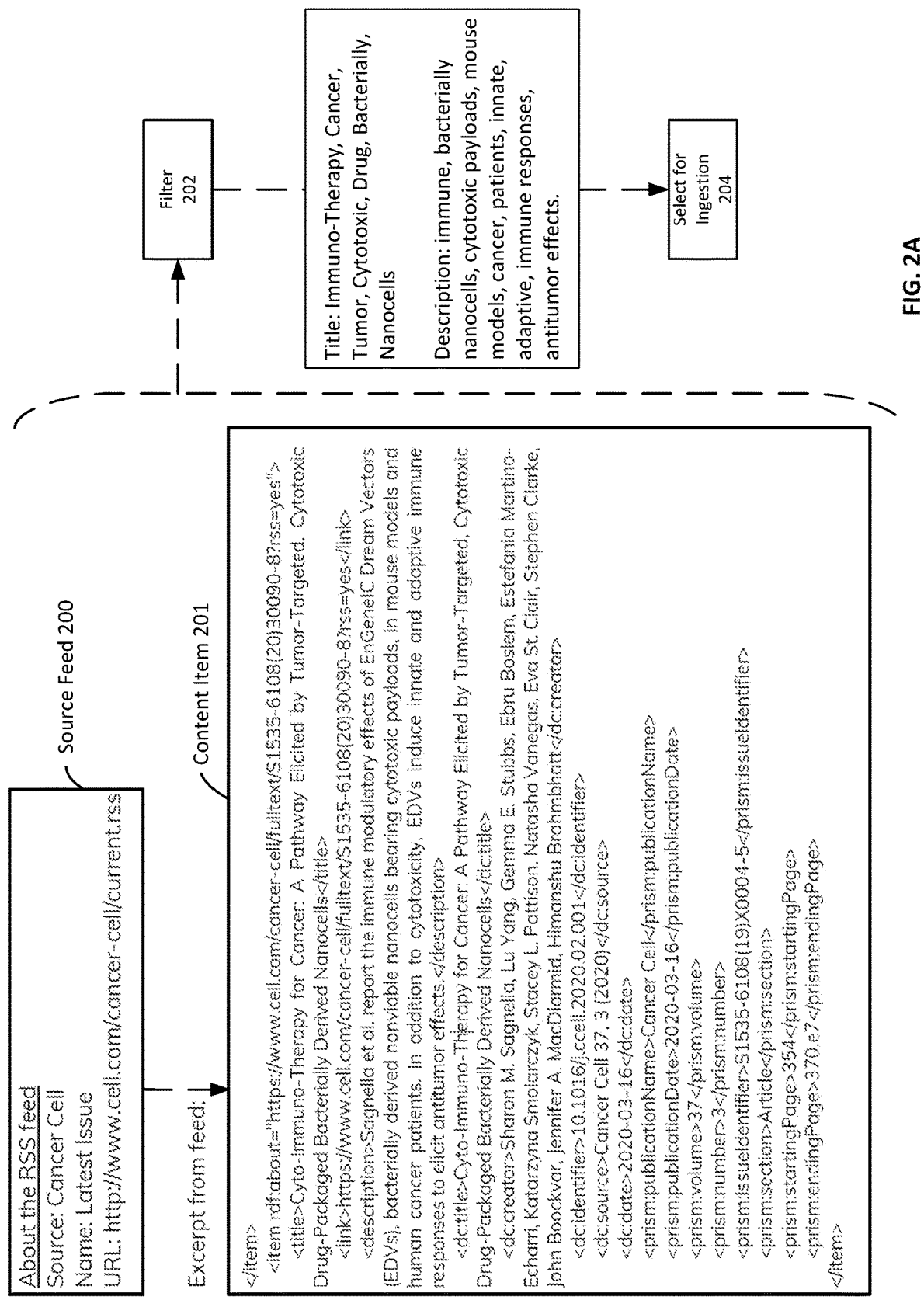
FIG. 2A and FIG. 2B illustrate examples of filtering and data ingestion for construction of content item records, in accordance with one or more embodiments.
Figure 2B:
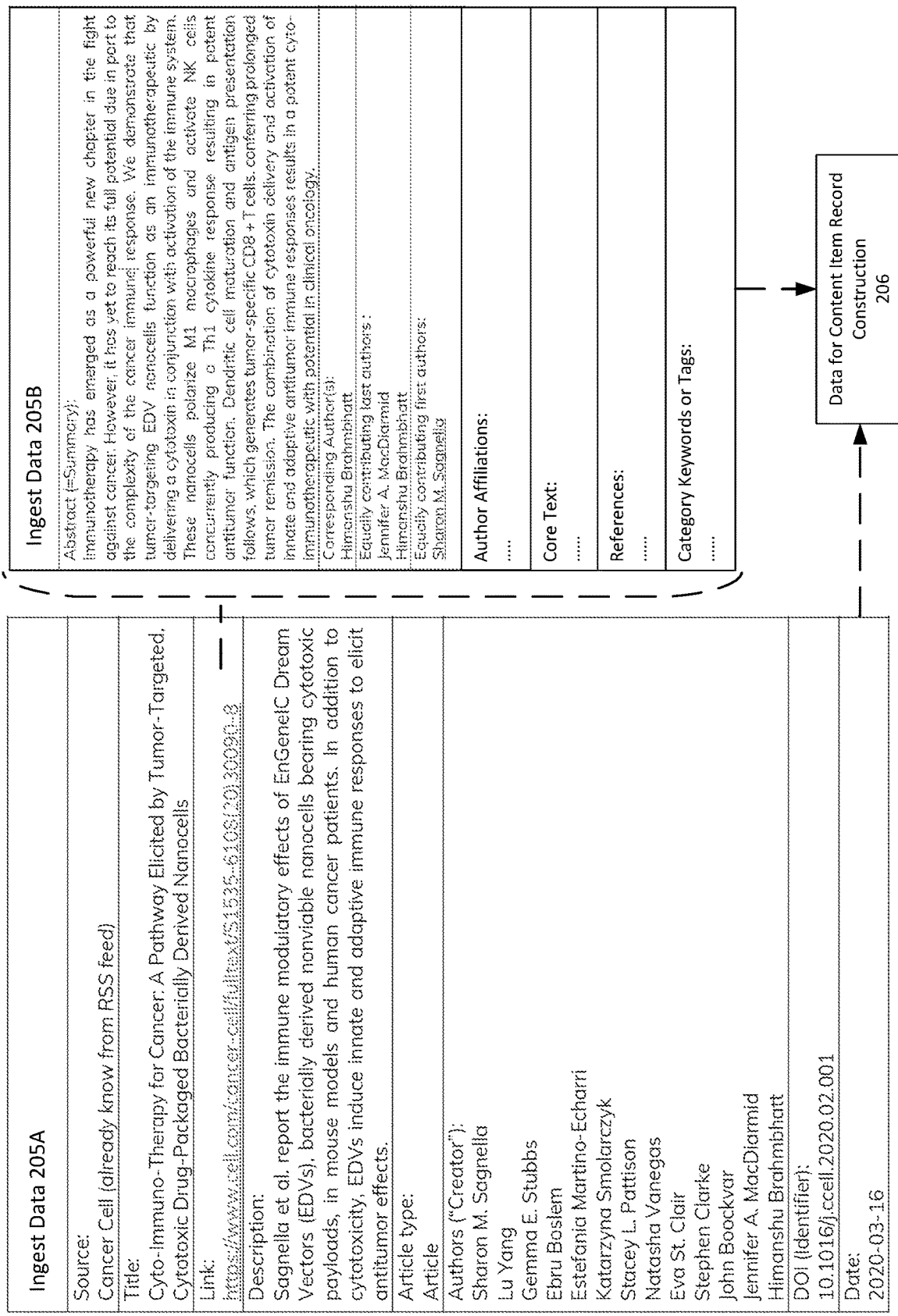

FIG. 2A and FIG. 2B illustrate examples of filtering and data ingestion for construction of content item records, in accordance with one or more embodiments. FIG. 2A illustrates an example of a source, like an RSS source feed 200, from which an example content item 201 may be identified. For example, a computing system 102 like that discussed with reference to FIG. 1 may monitor a variety of different sources to identify new content items for ingestion. In some cases, the monitoring of sources to identify content items for ingestion may include querying various source APIs, such as those of scientific editors or publications (or editors or publications in other fields) or social media or other sources, RSS feed monitoring or aggregation, or web scrapping of public data (on source websites, including but not limited to scientific editors, newspaper website, social media, and the like). The example source feed 200 shown below may correspond to a specific publication, like CANCER CELL, on which information about (e.g., new) articles or other publications from the source are provided to subscribers of the feed. The example content item 201 identified from the source may correspond to a research publication by the source, information about which may be published on the feed. For example, a schema of the source feed 200 may include encoded information which may (e.g., typically) be rendered for viewing by a user. Similarly, in other examples, an identified webpage may include encoded information about a content item, like in HTML format, or be a content item. Various labels like "title" and "description" (in the present example) may be identified by a filter 202 to determine corresponding textual content, such as for initial processing by the filter 202. In other examples, other labels may correspond to similar categories of information, like "content" or "abstract" or "summary" rather than "description." In some examples where a standardized format of encoding is utilized, some labels may be associated with given corresponding textual content (e.g., like a title element within HTML content) intended to indicate to a user information about the content.

In some example embodiments, the filter 202 is configured to identify labels utilized by one or more sources to identify corresponding textual content of a content item for processing by the filter. In some examples, the filter 202 may be trained to identify labels within the encoded information obtained from one or more sources. In some examples, a filter 202, like a source-specific filter, may be selected when a content item 201 is identified from a given source to which the filter corresponds. In some cases, a filter 202, like a data domain specific filter, may be selected based on the data domain of the information about the content item, like whether the information was obtained from an RSS feed or a webpage hosting audio content or a webpage hosting video content or the like, or the data domain of the content item in cases where the content item itself is identified (e.g., in some cases without other metadata about the content item, like a direct link to a full text article). Which filter(s) are selected may govern label identification in the information about the content item 201 or the content item itself to identify corresponding textual content for processing by the filter 202. Examples may include identification of a publication or similar type of date (e.g., where content older than a threshold that is available from a source may be omitted from selection) for the content item, a title for the content item, and a description (or summary or comments or abstract) for the content item based on one or more labels detected by the filter. The information corresponding to a label, in turn, may be processed by the filter 202 to score the information in relation to the label, and score other information corresponding to other labels. In some cases, the score of information in relation to a label may be based on identification of one or more keywords or phrases, like chunks of natural language text, within the information or nearness thereof where the chunks of natural language text correspond to topics of interest. In some cases, the score of information in relation to a label may be based on identification of one or more values, like a date or duration or other values, within the information where a date or duration or other values may be compared to one or more thresholds for selection of a content item.

Thus, as shown in the illustrated example, such as for the "description" label, chunks of natural language text (e.g., as topics of interest or relevant to a topic of interest) like "nanocells" and "immune responses" may be identified within the textual information corresponding to the label. Different chunks of text to be detected by the filter 202 may be associated with different scores or weights for determining a score for a label based on the aggregate of chunks detected in relation to the label. In cases where a near-word (or near-match) is found within the text content, a weight may be assigned based on the nearness of the word or closeness of the match. The scores for the different labels may be compared to one or more thresholds, individually, or in the aggregate, or both to determine whether to select the content item for ingestion 204.

FIG. 2B illustrates an example of ingest data, such as data ingested by a computing system for constructing a content item record. In some cases, the ingest data 205 collected for a content item may be obtained in response to selection of the content item for ingestion, such as based on one or more scores for information about the content item (or of the content item) exceeding a threshold. Example ingest data 205A may be parsed from the information about the content item, like the example content item information 201 in shown in FIG. 2A, into corresponding informational sub-types, such as based on labels identified with the content item information. In many cases, additional ingest data 205B may be obtained, such as based on one or more informational components included in ingest data 205A. In some other examples, yet additional ingest data (not shown) may be obtained based on information components included in ingest data 205B. In other words, an ingestion process implemented by a computing system (e.g., like computing system 102 in FIG. 1) may obtain a sequence of ingested data corresponding to a content item, which may be parsed (e.g., based on labels or other NLP processes) to identify textual content or other information component descriptors that correspond to various informational sub-types.

As shown in FIG. 2B, example ingest data 205A may comprise information components for information sub-types parsed from raw feed data by which a content item is filtered for ingestion. For example, ingest data 205A may include a source name, title, description, data, etc. or other information about a content item. In many cases, such information may include resource locator information by which the content item (or additional information about the content item) may be ingested. For example, ingest data 205A may include a DOI by which the content item may be identified and obtained, or a URL corresponding to the content item. Such informational sub-types may be detected and the respective informational component (e.g., like a URL for a link sub-type) may be accessed to ingest additional data corresponding to the content item, like ingest data 205B. In some cases, link information within ingest data may correspond to a URL, like to a webpage, which may further include a link or resource sub-type including information by which a content item may be accessed. Accordingly, in some example, the system may retrieve additional sets of ingest data in relation a content item, such as in response to detecting an information sub-type comprising link information corresponding to the content item. In the illustrated example, link information is identified in association with the link sub-type from ingest data 205B and the system may utilize the link to ingest data 205B corresponding to the content item (e.g., which may include information similar to or different from the ingest data 205A). Over the ingest data 205A, the ingest data 205B may include additional textual content corresponding to the content item or about the content item, such as an abstract or summary from the content item, core text from the content item, and other information like references cited, keywords or tags (or hashtags) corresponding to the content item and the like.

The ingest data 205 obtained in relation to a content item may include redundant information about the content item, like author information, title, or in a summary or description across different ingested data 205A, 205B obtained in relation to a content item. In some embodiments, an NLP model, which may be applied to the obtained information to identify labels corresponding to information sub-types and parse respective informational components (e.g., as shown), may process and dedupe informational components across the ingest data to obtain an informational component data for content item record construction 206. Specifically, a NLP model may read and populate informational component data for a standardized set of information sub-types (not all of which need be populated for each content item, as some may not apply to some types of content items) to construct a record of the content item based on the ingest data.

While the illustrated example pertains to a text-based article, other types of content items may be processed. For example, the link information identified from ingest data 205A may correspond to a webpage including embedded video or audio content, or a file hosting service by which the video or audio may be obtained. Example ingest data in such cases may include some similar (e.g., title) or different information sub-types (e.g., duration) among others. Some informational sub-types, like core text, may be obtained by application of one or more processes to obtained content item data, like to audio data from an audio or video stream, to obtain corresponding natural language text from speech detected within the audio stream of the content item. In other example, an OCR process may be applied to image inputs, either from video frames or files containing textual content as image data.

Figure 3:
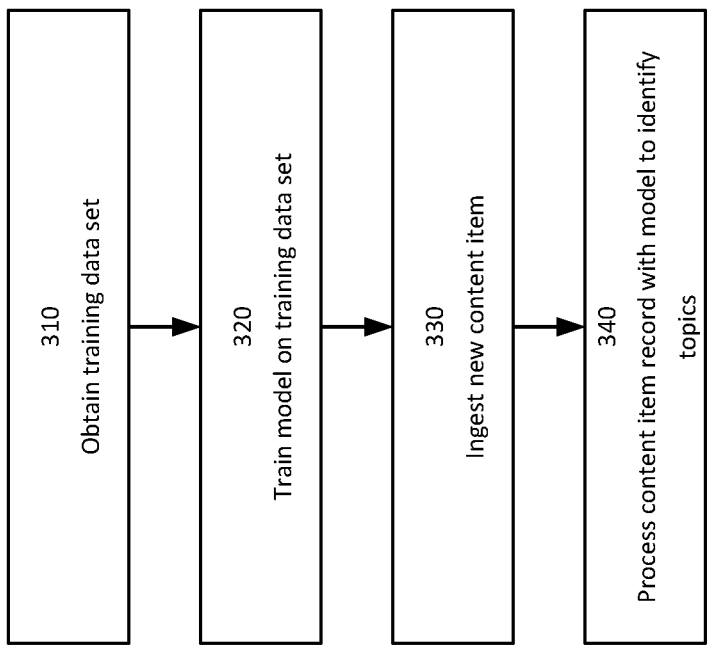
FIG. 3 illustrates an example flow diagram for identifying topics of interest for content items, in accordance with one or more embodiments.

FIG. 3 illustrates an example flow diagram for identifying topics of interest for content items, in accordance with one or more embodiments. Depending on the embodiment, operations of the example process 300 may be performed by one or more computing devices. In some embodiments, the operations may be divided between multiple different computing devices. In some embodiments, a computing device, like a computing system, like a server performs the operations within a client-server architecture. In some embodiments, one or more subsystems or models may be implemented in hardware or software on a computing device performing one or more of the operations of the process. Some embodiments of different ones of the operations may rely on data stored in one or more databases, which may be local databases, databases accessible via a network (public or private, and which may include the internet), distributed databases with a cloud networking architecture, or combination thereof.

In a step 310, a computing device obtains a training data set. For example, the computing device may obtain the training data set from one or more databases like those described above. In some embodiments, the training data set comprises training chunks of natural language text (e.g., from content item records or other corpuses) and training records identifying topics of interest within corresponding training chunks of natural language text. Training chucks of natural language text may be obtained with respect to a given topic of interest from corresponding seeded content item records associated with the topic or other sources and may include a word, phrase, sentence, or paragraph of text within the training data set. In many cases, given textual content of a content item within the training data set may include multiple ones of such words, phrases, sentences or paragraphs. In some embodiments, training chunks of natural language text are linked together, such as by key-value pairs or linked list or other data structure, and the linking of the training chunks encodes a sequencing of words, phrases, sentences, or paragraphs as identified from the respective textual content of a content item.

In some embodiments, a computing device obtains a training data set by scraping one or more source information corpuses for training data. An example information corpus may include structured data (e.g., a repository of specific data, like content item records identified to the training set, or other natural language texts identified to the training set) or unstructured data from which data, like natural language text, may be parsed from other types of data to obtain structured data. For example, in some embodiments, a structured dataset of content item records is formed based on ingested information about the content items, such as by performing one or more of the aforementioned ingestion processes for a plurality of different content items. For example, for a given topic of interest, at least some training records may be seeded, like with labels, indicating that one or more content items correspond to the given topic of interest. For example, the content item and information about the content item, like metadata, may be ingested to populate a corresponding content item record. A content item record may also be augmented with other metadata, like source metadata obtained from the source or from other sources about the source, or by obtaining additional metadata information about component information of a given information sub-type, such as by obtaining information about a given author, or by forming associations between component information of a given information sub-type with other records, such as by authorship, source, affiliations thereof, or other information sub-types. Topics of interest may be seeded within training records for at least content item records identified to the training data set.

Other relationships may also be identified between at least some content item records identified to the training set, such as where multiple content items sharing a same author are identified to the training set, and the topic of interest labels with respect to those content items may be the same or differ. Thus, as described above, the training data set may include records including labels identifying topics of interest for at least some structured data items (e.g., content item records, chunks of natural language text, or linked chunks of natural language text) for training. The labels applied to content item records may be associated with the various metadata therein, like one or more indicated authors, and thus extend to relationships between content item records sharing a same author (or source or affiliation, etc.) by which a trained model may infer topic relations based on such metadata when included with a content item record. Examples of such additional data may be obtained by ingesting various source or content metadata in relation to a content item record, either in connection with or after an ingestion process. In some cases, some of the additional data may be identified from other records, which may correspond to authors, or sources, or affiliations, or other informational sub-types, based on information included in the content item record. Associations may be identified between the content item record and other such example records or the content item record identified to the training set may be populated with such information from records corresponding to information sub-types, such as authors and respective author information, affiliations of authors or source or institution, references (e.g., which may correspond to other content item records), and the like.

In some embodiments, the training records include a hierarchical encoding of topics of interest identified for different ones of the training chunks, linked training chunks, or content item records. Thus, for example, the topic labels for given chunks, linked chunks, or content items may be selected from available topics within the hierarchical encoding. The hierarchical encoding may indicate at least some topic-subtopic relationships by the hierarchical structure, like a tree structure, such as by a topic node corresponding to "immunology" with sub-nodes corresponding to sub-topics within immunology while another topic node may correspond to "pathology" and so on. Training of the model may identify relationships between different nodes or sub-nodes for topic identification based on the training data, which may be processed based on the hierarchical encoding and the identified relationships to generate new training data, like a graph of encoded topics, which may include links between nodes and sub-nodes that indicate distances, like a weight, indicative of their co-occurrence within training records (e.g., in content items or chunks) and thus relevance of a sub-topic (or topic) to another topic or sub-topic. In turn, the training data may be augmented based on such information (e.g., weights of links between nodes and sub-nodes corresponding to topics and sub-topics may be included in one or more training records) for subsequent iterations of training.

Thus, the training records may identify topics of interest for different ones of the training chunks or linked training chunks, and for different ones of the content item record from which the chunks were obtained. A training record may identify at least one topic corresponding to a training chunk or linked training chunks or a content item record. In some embodiments, a training record may identify multiple such topics of interest, such as for a content item, or a subset (e.g., one or more) of those topics of interest for a training chunk or a linked training chunk from the content item. Thus, for example, topics of interest that frequently co-occur may be identified with respect to a content item and some chunks or linked chunks of text from the content item and those different topics of interest may also be identified individually with respect to other chunks or linked chunks of text from the content item. The training records may segment aspects of content items in different ways, and additionally include information from other corpus of natural language text, such as chunks or linked chunks of natural language text which describe a given topic of interest.

In a step 320, a computing device trains a model on the training data set. For example, the comping device may train on the training set with one or more natural language processing algorithms to generate a natural language processing (NLP) model configured to provide an output indicative of whether a topic of interest is related to a content item based on natural language text obtained from or other associated with the content item. For example, the NLP model may output a prediction of the relevance of a topic of interest to a content item based on the natural language texts (e.g., included in an input content item record) of the content item and other input information for the content item based on the content item records and other data identified to the training data set. In some examples, the output may indicate for a set of topics of interest (e.g., one, some, or all) respective predictions, like a score, for an input content item record that describes the degree each topic of interest is predicted to relate to the content item record. The training may comprise one or more of the training techniques described previously herein on a training data set like that described above. Thus, for example, the NLP model may be a neural network or other model or combination of models described herein for identifying topics of interest within a content item record including natural language text inputs to the NLP model.

In some embodiments, a training data set may be split uniformly at random into k disjoint subsets (k-fold cross validation) of similar subset sizes, like subsets of aforementioned training records identified to the training data set. In some embodiments, a portion of the training data set may be split uniformly across the subset but other portions of information within the training data set may be included in each subset or at least some subsets. For example, in some case, content item records identified to the training data set may be subdivided at random while other information like topic identifiers (or a hierarchy thereof) and at least some corresponding chunks of linked natural language text may be included in each subset. Some embodiments may train on each formed subset, such as by selecting a given subset as a training data set for a particular iteration of a model (e.g., like an initial model, which may be iteratively trained on other data). Some example k-fold values may be k=5 or k=10, or between 5 and 10. For each of the k disjoint subsets, a model may be trained or adjusted based on the subset, and may be evaluated on the union of the k−1 remaining subsets. Hence, some training operations may result in k instances of each model, one for each disjoint training dataset. Each model may be evaluated, such as based on the other validation records or records not within the k disjoint sub set. For example, each model may be evaluated based on a mean or squared deviation of the accuracy, precision, recall and f-score. A given one of the models determined to have performance greater than other at least one, some, or all of the other models may be selected for further training. For example, the model may be trained (e.g., iteratively) based on other records identified to the training set (e.g., from other subsets or new training records) or based on other content item records or other information, and the model (or iterations thereof) may be validated based on a validation set which may include new, different, or additional validation records (e.g., may change over time as training data is augmented and portions of training data are selected for validating iteration of the model).

A model, or models, trained by the computing device may be stored within a database for subsequent utilization by the computing device or another computing device. In some cases, a version of an iteration of a model (e.g., like a first model) is selected by a computing device for processing inputs, and another version (e.g., like another copy, like a second model) of the iteration (or a subsequent iteration) of the model may be trained (e.g., iteratively) by the computing device or another computing device based on feedback, resulting outputs of the first model, and other information by which a training set may be augmented to generate a new iteration of the second model. Performance of the new iteration of the second model may be determined based on a comparison of results from processing of a validation set by the new iteration of the second model with results from processing of the validation set by one or more other models (e.g., like the first model). In turn, if the new iteration of the second model yields more accurate results than the first model, the new iteration of the second model may be provided for utilization by a computing device to process new inputs (e.g., with greater accuracy). The computing device may also utilize the new iteration of the second model to process prior inputs (that may optionally include previous results output by the first model or another prior model) to determine new resulting outputs (e.g., with greater accuracy) for those prior inputs. In other words, topics of interest may be determined and updated for content item records as a model for processing content item records is updated through an iterative training process like those discussed above and elsewhere herein.

In a step 330, a computing device may obtain an input to process or receive a request to process an input. The computing device, for example, may obtain or receive a content item record and utilize a model, like a model trained as described above, to identify topics of interest for the content item based on the content item record. The content item record may correspond to an ingested content item, the information associated with which may ingested as described with reference to FIGS. 2A and 2B, and processed to generate a content item record, like a structured content item record. In some embodiments, a NLP model may be trained in accordance with a process like that described above (e.g., by training on a training data set including (e.g., at least some) content item records associated with the respective information ingested) to parse ingested information associated with a content item and construct a corresponding content item record (e.g., by output textual content for information sub-types of a structured content item record based on the ingested information for the content item). The same, or a different NLP model, which may be trained in accordance with a process like that described above (e.g., by training on a training data set including (e.g., at least some) content item records associated with respective topics of interest) to identify (e.g., by scores) topics of interest related to a content item represented by its content item records (e.g., by outputting scores for respective topics of interest based on information contained within the content item record). Thus, for example, the output of one model (e.g., a content item record) may be utilized as input to another model to determine different information. Some embodiments may, however, utilize a single model which may output a result set including, for example, a structured content item record and scores for topics of interest based on ingested information (e.g., raw or based on label identification to parse out potential content for information sub-types in structured content records) for a content item.

In various embodiments of step 340, topic identification for a content item may comprises processing an input content item record, like a structured content item record, that contains various information sub-types including natural language text. In other examples, information sub-types may be relatively undefined within the input, like in ingested information (but which may be processed to obtained natural language text from speech or images containing text). In either instance, natural language text may be segmented into chunks, such as based on natural breaks identified within the texts, like periods or other characters, or paragraphs by identified spacing and the like or by information sub-type, according to an encoding of the natural language text, and the like. In some embodiments, one or more chunks may be linked, such as to represent order among the different chunks, like a sequence of sentences or paragraphs. A NLP model, like that described above, may be utilized by a computing device to process input natural language text of a content item record, which may include chunks of natural language text and linked chunks of natural language text, to identify topics of interests related to the content item based on the input natural language text. For example, the NLP model may analyze input text and provide output scores corresponding to one or more topics of interest based on their respective relevance to the input text as determined by the model. The model may evaluate different information sub-types in different ways, for example, core textual content (or a title or abstract or description) may be evaluated to score topics of interest based on chunks of text inferred to be relevant to different topics of interest while a name of an author (or source or affiliation or other information sub-types) may be evaluated to score topics of interest based on association of the author (or source or affiliation or other information sub-types) to different topics of interest. Similarly, references cited may be evaluated, and various ones of the reference may correspond to content items previously evaluated by the model and associated with different topics of interests. The model may weigh these different factors based on the received inputs for the content item in relation to topics of interest to output respective topic of interest scores for the content item. Example input information to a model and an example output of scores for topics of interest is provided below.

Input (e.g., an example content item record including example informational sub-types and corresponding example informational components):

Title: Cyto-Immuno-Therapy for Cancer: A Pathway Elicited by Tumor-Targeted, Cytotoxic Drug-Packaged Bacterially Derived Nanocells Description: Sagnella et al. report the immune modulatory effects of EnGeneIC Dream Vectors (EDVs), bacterially derived nonviable nanocells bearing cytotoxic payloads, in mouse models and human cancer patients. In addition to cytotoxicity, EDVs induce innate and adaptive immune responses to elicit anti-tumor effects.

Authors: Sharon M. Sagnella, Lu Yang, Gemma E. Stubbs, Ebru Boslem, Estefania Martino-Echarri, Katarzyna Smolarczyk, Stacey L. Pattison, Natasha Vanegas, Eva St. Clair, Stephen Clarke, John Boockvar, Jennifer A. MacDiarmid, Himanshu Brahmbhatt Abstract: Immunotherapy has emerged as a powerful new chapter in the fight against cancer. However, it has yet to reach its full potential due in part to the complexity of the cancer immune response. We demonstrate that tumor-targeting EDV nanocells function as an immunotherapeutic by delivering a cytotoxin in conjunction with activation of the immune system. These nanocells polarize M1 macrophages and activate NK cells concurrently producing a Th1 cytokine response resulting in potent antitumor function. Dendritic cell maturation and antigen presentation follows, which generates tumor-specific CD8+ T cells, conferring prolonged tumor remission. The combination of cytotoxin delivery and activation of innate and adaptive antitumor immune responses results in a potent cyto-immuno-therapeutic with potential in clinical oncology.

Affiliations: EnGeneIC Ltd, Building 2, 25 Sirius Road, Lane Cove West, Sydney, NSW 2066, Australia; ANZAC Research Institute—Royal North Shore Hospital 38 Pacific Highway, Sydney, N S W 2065, Australia; Northwell School of Medicine, 3rd Floor, 130 East 77th Street, New York, NY 10075, USA Output (e.g., example scores indicative of determinations of relevance of respective topics of interest to the above example input by a model, like a model trained in accordance with the above described techniques):

oncology and immuno-oncology=95?;

immune disease=53%;

disorder of the endocrine and metabolic system=24%;

vascular disease=32%;

antibiotic resistance=21%;

genetic disease=36%;

gene therapy and genomic editing=58%;

microbiota=25%;

stem cells and regenerative medicine=81%;

neuro-immunology=86%;

mental processes=26%;

neurological disease=12%;

medical cognitive science=37%;

epigenetic=26%;

social neuroscience=26%;

synthetic biology=15%.

Some example embodiments of a model may evaluate an input for many more topics of interest, like 20, 100, or over 1000 different topics of interest. In some embodiments, the model may output a set of topics of interest above a threshold (e.g., above 15%, 30%, or other number), or a set of topics of interest (e.g., 5, 10, or 15 or other number) determined having the highest scores. In some examples, an output may include both such sets or multiple sets based on different thresholds or selection criteria. For example, a topic hierarchy, like that discussed above, may be utilized to output some topic of interest scores based on sub-topic scores, and also output highest, ranked, or above a threshold sub-topic scores. While the above output indicates a score as a percent, other scores are envisioned, like a weight, a number within a range, or other value by which evaluations may be performed. In some embodiments, a result set of topics of interest output by a model for an input may be encoded in a data structure associated with the content item record, or otherwise stored in association with the content item record. In some embodiments, the data structure may include one or more labels or rules, such as based on the scores of topics of interest and a hierarchy (or graph) of topics of interest and associations between the topics of interest within the result set, such as by which other subsystems may select the content item for a notification for a topic of interest.

Thus, for example, the above noted trained NLP model, like an NLP model for processing a structured content item record to predict one or more topics of interest to which the content item relates, may be applied to ingested data of a new content item to determine scores for topics of interest based on information about the content item. For example, the NLP model may include, but is not limited to, performing operations such as a statistical calculation of a likelihood that a content item belongs to a given topic based on an analysis of the most probable words descriptive of the given topic that are used in the obtained natural language text for the content item. As explained previously, the model may be trained to perform such operations based on a training set of content item records that include associated labels, like a topic of interest to which the content item belongs or does not belong. The model may output probabilities relative to topics, and such probabilities may be responsive to training of the model on the obtained training data set, which may be augmented over time, and the model iterative trained (e.g., periodically) based on the training data set augmented with additional (or new or different) training data.

In turn, example embodiments may generate a notification for a topic of interest based on scores for the topic in relation to one or more content items. For example, when a newly identified content is ingested, topics of interest may be scored for the content item by step 340 with the trained model, and a notification generated for a topic, or a subset of topics, having a score above a threshold for the content item. In some embodiments, a newly identified content item may be a content item which is not only recently ingested but also associated with a date, like a publication date, within a threshold period of time. Thus, for example, as new and old publications are ingested when new (or initial) sources are scraped for information about content items and content items, notifications for a topic of interest may be biased to recently published content items rather than old ones (which, by contrast to recently published content items, may be included or indicated in a notification as relevant to a topic of interest but may not trigger generation of a notification for the topic of interest).

An example notification may include information about the content, like information from one or more information sub-types from the content item record. Some embodiments may be configured to select portions of content, like portions of text, like one or more chunks of text or linked chunks of text, from an information sub-type to present as notification information. In some cases, those chunks of text or linked chunks of text may correspond to textual content associated with a topic for which the notification is being generated, like chunks of text or linked chunks of text which the model scored highly (e.g., above a threshold) for the topic. The notification information may present such example information in different ways, like excerpts of text, or keywords analysis, and in relation to other topics having above threshold scores for the content item or those chunks of text or linked chunks of text. In turn, the notification may be provided to client devices of users having selected the topic or a topic in the subset as a topic of interest.

Some embodiments may select one or more feedback options to solicit from one or more users, such as ratings (or scores) in relation to notification information or portions thereof about the content item, the content item itself, or other information included with the notification or feedback on the content item (e.g., like portions of text within the content item or notification information, like annotations, which may be associated with a score). In some embodiments, natural language text, like comments, may be received and processed by a NLP model to infer a score. In some cases, the notification may be provided to a select number of users, like curators, which may be curators for one or more topics of interest to which the content item relates, to solicit user (e.g., curator) feedback prior to the notification being provided to other users. In some cases, the solicited curator feedback may be collected and associated with or included in the record of the content item, such as by one or more scores in relation to the information about the content item for which respective scores were provided, one or more scores corresponding to the relevance of a topic of interest to the content item, and the like. Embodiments may train example models in step 320 based on example feedback like that above, and step 330 may be iterated for a content item record after receiving such feedback (e.g., from one or more curators, or a threshold number of select users), and a determination to generate a notification for a topic of interest that is provided to a wider user base may be based on the resulting score for the topic after receiving the feedback. Some embodiments may incorporate one or more other determinations in relation to generating a notification for a topic of interest, at least one example of which is explained in more detail below.

Figure 4:
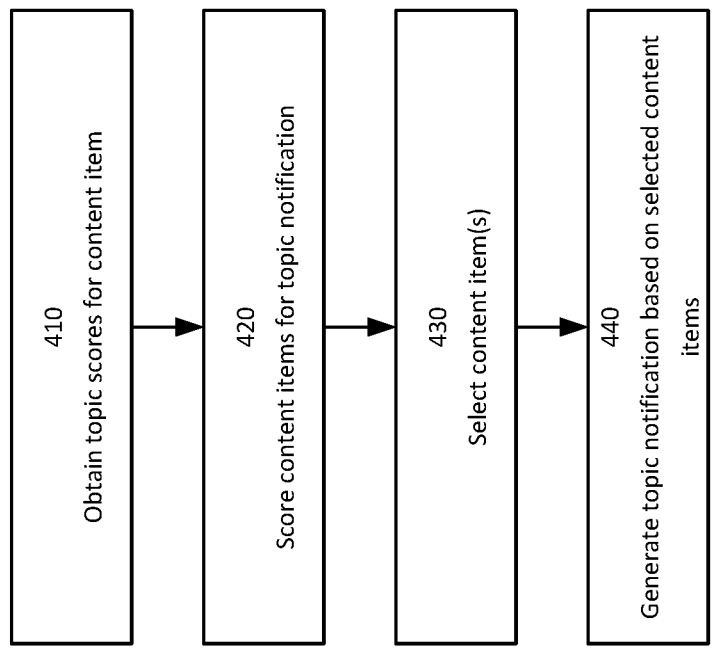
FIG. 4 illustrates an example flow diagram for generating a notification for a topic of interest, in accordance with one or more embodiments.

FIG. 4 illustrates an example flow diagram for generating a notification for a topic of interest, in accordance with one or more embodiments. Depending on the embodiment, operations of the example process 400 may be performed by one or more computing devices. In some embodiments, the operations may be divided between multiple different computing devices. In some embodiments, a computing device, like a computing system, like a server performs the operations within a client-server architecture. In some embodiments, one or more subsystems or models may be implemented in hardware or software on a computing device performing one or more of the operations of the process. Some embodiments of different ones of the operations may rely on data stored in one or more databases, which may be local databases, databases accessible via a network (public or private, and which may include the internet), distributed databases with a cloud networking architecture, or combination thereof.

As outlined above, a notification may be generated for a topic of interest based on a score of the topic of interest for a content item, such as to notify users about the content item in relation to the topic of the interest. Some embodiments, however, may employ richer notifications based on the results of one or more process for generating notifications. Specifically, while a topic of interest may score highly for a content item, other factors may weigh for or against generation of a notification for the topic of interest for, or otherwise based on, the content item. In many cases, even when a topic of interest scores highly for a content item, it may not (yet or ever) warrant selection for a notification. Example processes like those discussed below are intended to improve notifications in various ways, such as by inclusion of contextually relevant information for a topic of interest in notification information, and improved selection of content items for generation of notifications. Specifically, example processes like those discussed below may generate a notification for a topic based not only on identified relevance of a (new) content item to the topic, but based on other factors, like a predicted impactfulness of the content item to the topic.

In a step 410, a computing device may obtain scores of topics of interest for content items. In some examples, and for ease of explanation, the computing device may obtain scores of a topic of interest for a subset of content items. Embodiments of the computing device, however, may perform example processes explained below based on a plurality of topics of interest, like related topics of interest, based on respective weightings of relatedness between different ones of the plurality of topics of interest and a plurality of content items, like a plurality of subsets of content items, for which the plurality of topics of interest were scored. In either instance, scores for a topic of interest for a subset of content items may be obtained by processing a plurality of content items, such as by steps like those discussed with reference to FIG. 3, and subsequently selecting the subset of content items where each content item in the subset has a score for the topic of interest. In some cases, only those content items having a score for the topic of interest where the score exceeds a threshold may be selected to a subset.

In step 420, a computing device may score content items for a topic notification. For example, the above noted subset of content items having scores for a topic of interest may be evaluated to determine whether to determine whether to generate a notification for the topic of interest. Some embodiments may score content items based on a predicted impactfulness of the content item to the topic of interest. As described herein, a variety of metadata, like source and content metadata, may be ingested in relation to content items and sources of content items. Content item records may include such metadata or may be associated with such metadata. For example, informational components of information sub-types within a content item record may include one or more keys, like an author's name or affiliation or source or resource locator of the content item, which may correspond to values, like in a key-value store, where the values correspond to other records or information associated with those keys. An author's name, as a key, for example, may return values indicative of statistics for the author, like a ranking of the author in relation to a topic of interest (e.g., within the author's line of work), or a ranking of how published the author is in relation to a topic of interest, or popularity of the author, and the like. Similarly, a topic of interest scored for the content item may be a kay and return values indicative of statistics for the topic of interest, like a frequency of occurrence of identification of the topic of interest as relevant to recently published content items, or historically. A resource locator as a key may return values indicative of statistics corresponding to a popularity (e.g., views or accesses of the content item) or authoritativeness (e.g., number of times cited by other content items or based on peer review information) and the like. An affiliation or source as a key may return values indicative of statistics like a public ranking or website ranking or publication ranking of a university, publisher, journal, research institution, company, and the like that is associated with obtained content (e.g., like from assignee/filing entity information from a patent publication or otherwise indicated in relation to content or based on authorship). As noted above, a value may be an identifier of a record including such statistical measures as tracked over time, or a value may be a vector encoding such information by a given schema. Information on which such statistical information is based may be ingested in relation to a content item, source of the content item, or other sources based on information about the content item or source.

A model may be trained, as described herein, on content item records including such information or associations with such information or records of such information to predict impactfulness of a content item on a topic of interest. Training data may identify an impactfulness score for at least some content items represented in the training data by which a model may be trained in accordance with processes described herein to output a predicted impactfulness, like a score, for an input content item record containing or associated with such statistical and other information. Impactfulness scores for content item records in training data may be seeded based on curator feedback on historically relevant and impactful content items on a topic of interest or otherwise bootstrapped based on other metrics, like number of times a content item is cited by other content items, or other data by which some content items within the training data may be indicated as impactful. In turn, an output of the trained model may predict an impactfulness of a content item.

Predicted impactfulness for content items may be determined periodically, such as to capture trends in determined impactfulness scores. A newly published content item by relatively unpublished authors may, for example, initially have a relatively low predicted impactfulness score for a topic of interest to which the content item relates, and trend upward over time as it is cited by other content items and the impactfulness score updated. Periodically determining impactfulness scores for content items, storing those scores, and evaluating those scores may yield to identification of trends with respect to a content item, a set of content items, a topic of interest, authors, affiliations, and the like. Embodiments may determine to generate a notification for a topic (e.g., that includes notification information for a content item relevant to the topic of interest) based on detection of positive trends in predicted impactfulness (e.g., based on increases in statistical metrics determined from ingested information and upon which one or more values are based). User (or curator) feedback for the content item and notification for the topic of interest may yield feedback scores that negatively or positively support impactfulness scores by which determinations to generate notifications are made. Moreover, determined impactfulness scores may be associated with content item records which may be identified to a training set, and iterative training of a model may detect trends in determined impactfulness scores, such as to output an indication to generate a notification for a topic of interest for a content item based on such trends. For example, determined impactfulness scores may be stored in association with content item records for representation in training data to iteratively train the model to improve detection of thresholds for generating a notification based in trends within predicted impactfulness of content items for topics of interest.

In an example embodiment, a predicted impactfulness score for a content item, like a scientific article, may be determined in accordance with the above techniques based on example data like that described below. In the example case, an impactfulness score may correspond to a predicted scientific impact of the content item on a topic of interest related to the content item. A model may evaluate the scientific impact of the article based on the corresponding content item record and other data. Articles sharing a same topic of interest may be ranked according to their predicted impact scores. The model may predict an impact score for input data corresponding to the article, like a content item record including or associated with values (e.g., statistical values like those described above) which may be based on (but not limited to or required to be based on in every case) information such as:

author metrics: h-index, g-index, i10-index, total citation number, years of experience in the topic, average number of citation per article, Clarivate annual ranking and others available;

journal metrics: Clarivate Analytics Impact Factor, Scopus Journal Analyser metrics (CiteScore—SNIP), SCImago Journal Rank, Google Scholar Metrics, and others available;

affiliation metrics: topuniversities.com ranking (for students), World University Ranking Centre, Scimago Institutions Ranking, world-class researchers list by Web of Science, end others available; and popularity indicators: for example number of likes, downloads, shares or other indicators available on, but not restricted to, publisher websites and social media.

Example values for the different metrics may, as described above, be determined for different keys within informational sub-types of content items and obtained as input to a model based on such keys as represented in respective information-subtypes of a content item record for processing. Thus, input data to a model for predicting a scientific impact of the article may include, but is not limited to information like that above based on corresponding content item record information with example values like:

id article: #2589341;
impact factor clarivate=2569;
SJR=25;
SNIP=32;
google_scholar_ranking=368;
h-index=7;
g-index=10;
i10-index=25;
citations 24;
experience_years=2;
average citation_per article=36;
clarivate_ranking=21;
top_universities_score=369;
world_university_ranking=41;
scimago_institutions_ranking=98;
world-class_researchers=65;
nb_likes=3598;
nb_visualisations=26951;
nb_downloads=459;
nb_shares=1954.

Iterative training of the model may yield to improved scientific impact scores that account for situations such as very young authors or audience size (e.g., of more popular publication sources). Example training algorithms applicable to developing a model like the above, and others described herein may include labeling of content item records and may be based on open-source software libraries such as XGBoost, Keras, Tensorflow or Scikit-Learn. Examples models may include, but are not limited to, or may incorporate k-nearest neighbor algorithms, support vector machine, naive Bayesian models, decision trees and random forests, linear discriminant analysis or linear regression analysis by which information about content items may be inferred. In some examples, distances, like weights indicative of relationships between content items, the respective informational components therein, and other data, may be determined by metrics such as the Euclidean distance, the cosine similarity or the Levenshtein distance for text sequences matching. In various example embodiments, neural networks may evaluate or train on results determined by such algorithms or based on distance measures or incorporate aspects of such algorithms and distance metric concepts. Accordingly, a model may incorporate algorithms by which some component scores may be determined based on values like those outlined above, examples of which may include:

journal_score=(snip/c1+sjr/c2+citescore/c3);
author_score=log(experience_years)*(clarivate_ranking*h_index)/sum(h_index);
affiliation_score=log(world_university_ranking+scimago_institutions_ranking)/2;
global_score=(a1*journal_score+a2*author_score+a3*affiliation_score)/3; // where coefficients (e.g., weights) c1, c2, c3, a1, a2 and a3 may be updated and based iterative analysis or feedback.

Thus, for example, an output of a model may be based on component scores (with example values, like rank, shown) such as:

journal_score=356;
author_score=25;
affiliation_score=32;
global_score=2569.

In some example embodiments, a predicted impactfulness score may be based on detected trends in examples component scores like those above, and the example global score may be indicative of a weighted measure of current impactfulness. Various training techniques may be applied to the data and scores like those above in relation to content item records and topics of interest to determine a predicted impactful score of the content item to the topic of interest. As various ones of the statistical values change, an updated predicted impactfulness score may be determined by periodically processing content item records and information like that above, and the predicted impactfulness score may yield to both the changes in the statistical values and trends of the statical values and scores (which may include model outputs) based thereon.

Thus, as outlined above, a score indicative of a predicted impact of a content item on a topic of interest may be determined. Such scores of predicted impact may be determined with respect to a plurality of content items sharing a topic of interest, and such scores may account for the determined relevance of respective content items to the topic of interest. Accordingly, the plurality of content items (e.g., as a subset of all content items ingested) may be ranked with respect to each other for the topic of interest based on one or more respective scores for each content item. Embodiments may determine to generate a notification for a topic of interest based on the scores of one or more content items within the subset, such as when one or more content items have associated scores that exceed one or more thresholds, or based on a ranking of the content items.

In a step 430, a computing device may select one or more content items within the subset based on a respective rank or score for generating a notification a topic of interest with which the content item is associated. In some example embodiments, for one or more given selected content items, like a content item having a highest score or rank, other content items related to the given content item may be identified and also selected. Related content items may be identified based on one or more distance measures determined between content items (e.g., based on the information therein). Some embodiments may cluster content items based on one or more of the distance measures being indicative of similarity between content items or the information therein. Examples of other content items may include content items from disparate sources, for example, where a scientific article is selected, related content items may include both general news reporting (e.g., about the discovery or results described in the article) as well as other related scientific articles, market report information based on the time of the publication of the scientific article and time of notification generation, and the like. In some example embodiments, content items may be selected based on a request received from a client device for recommend content items related to a topic of interest. Such selections may be performed in a similar manner as those described above but may be based on current or historical impactfulness scores (e.g., primarily) as opposed to a current predicted impactfulness for relatively new content items. In some embodiments, a received request may indicate a bias towards new/trending content items or current or historical ones. In either instance, selections may be based on scores that account for statistical metrics, such as, but not limited to, the journal h-factor, impact factor, number of visualizations, total number of likes, total number of downloads and other similar metrics for content items; graphs such as based on citations or other determined relevance such as based on distance between content items; user feedback scores indicative of users' evaluation of content items; feedback scores inferred from language processed commentary associated with content items; and preferences of other user determined to be similar to a user or vice versa based on distances between the users determined based on feedback provided by respective users on content items and generated notifications for shared topics of interest of the users. Selections based on factors like those outlined above are expected to reduce natural biases such as, but not limited to, very young authors with few publications or too popular journals. Identified related content items (or selected content items from the subset) may be ranked or re-ranked over several parameters, such as, but not limited to, author reputation, journal reputation, university reputation, popularity of the topic, quality of the scientific content, preferences of the final user, etc. In turn, content items for topic notification may be selected, such as by selection of top N ranked content items (e.g., from the subset or from related content items).

In a step 440, a computing device may generate a topic notification based on the selected content items. Client devices of users having indicated the topic as being of interest may be identified by the computing device and the topic notification transmitted to the respective client devices. The topic notification may include information about the selected content items, which may include, but is not limited to, access information for the content items, chunks of natural language text from the content items deemed most relevant to the topic of interest, chunks of natural language text or other information indicative of relationships between content items, and the likes. In turn, a user may access a received notification to view the notification information, optionally access one or more content items based on respective access information, and provide feedback by which aggregate user feedback scores for notification information and content items may be determined for improving future topic notifications as described herein.

Figure 5:
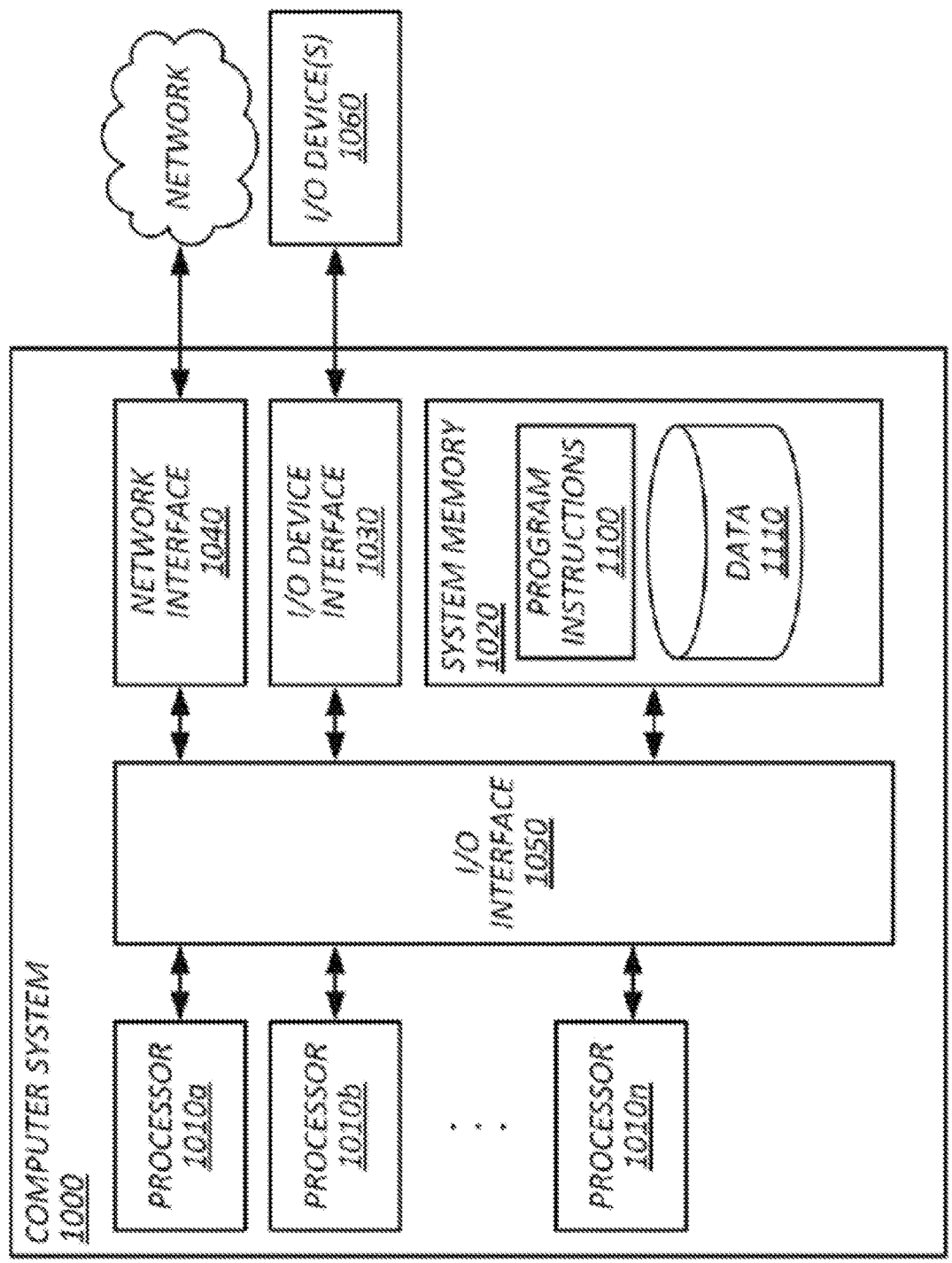
FIG. 5 illustrates an example computing system in accordance with one or more embodiments by which the present techniques may be implemented.

FIG. 5 is a diagram that illustrates an example computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000. For example, the computing system 1000, components thereof, or a collection of computing systems, may be operable to perform one or more operations and/or included in one or more entities to perform those functions. For example, computing systems like computing system 1000 may be utilized to store and process data like that illustrated with respect to FIGS. 2A and 2B, such as according to example steps shown in FIGS. 3 and 4, and may be organized in an architecture like that illustrated in FIG. 1. Thus, one or more computing systems 1000 may be utilized to perform operations with respect to generating notifications for topics of interest, such as by ingesting information about content items to construct content item records, identifying topics of interest and their relevance to content items based on records of the content items, selecting content items for a notification for a topic of interest based on their determined relevance and other factors, adjusting determinations by models based on obtained feedback with respect to notifications, content items, and other data, and the like, using techniques disclosed herein. Example elements of an example computing system are discussed in greater detail below.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a datacenter, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, where certain U.S. patents, U.S. patent applications, or other materials (e.g., articles) are incorporated by reference, the text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The invention claimed is:

1. A server-system for generating topic-relevant notifications based on topics of interest detected within content items by natural language processing, comprising:
　one or more processors programmed with computer program instructions that, when executed, cause the server-system:
　　identify, from a plurality of sources for respective pluralities of content items, initial content item information for the content items;
　　apply, based on a source and an identified content item, at least one filter to initial content item information to determine whether the identified content item exceeds a threshold likelihood of being potentially relevant to one or more of a plurality of topics of interest;
　　obtain, in response to determining the content item is potentially relevant to at least one of the plurality of topics of interest, additional content item information for the content item from the source of the content item based on at least some of the initial content item information;
　　construct a content item record comprising natural language texts parsed from the initial and the additional content item information for a plurality of different information sub-types, a given portion of natural language text being parsed from content item information for a given one of the information sub-types based on detection of one or more corresponding sub-type identifiers within the content item information;

provide the content item record to a natural language processing model, wherein the natural language processing model is configured to:

identify a topic interest for the content item record based on distances between chunks of natural language text within the content item record to chunks of natural language text indicative of at least one respective topic of interest, and score the identified topic of interest based on at least some of the distances, the at least some distances corresponding to chunks of natural language text indicative of at least the identified topic of interest;

detect, in association with at least one information sub-type populated for the content item record, a chunk of natural language text associated with value indicative of a score of the detected chunk of natural language text relative to other possible chunks of natural language text having respectively associated values for the information sub-type;

generate, in response to the score of the identified topic of interest exceeding a threshold indicative of content-topic relevance and the score of the detected chunk of natural language text exceeding a threshold indicative of impact on the identified topic of interest, a notification indicative of the content item and the identified topic of interest; and transmit the notification to a plurality of client devices based on received selections of the users of the client devices being indicative of interest in the identified topic of interest.

2. The system of claim 1, wherein the plurality of sources includes one or more sources selected from a scientific journal, publication, news media, social media, patent publications, and clinical trial registry.

3. The system of claim 1, wherein the plurality of sources includes one or more sources selected from an electronic subscription feed, a website, and a repository response to Application Programming Interface (API) requests.

4. The system of claim 1, wherein constructing a content item record comprises:

specifying a schema of a structured dataset of information sub-types for constructing content item records; and training a natural language processing model to parse obtained content item information having textual information in a plurality of other schemas based on identification of a correspondence of different portions natural language text within the content item information to respective information sub-types.

5. The system of claim 4, wherein obtaining content item information for the content item comprises:

obtaining the initial content item information from a subscription feed; and obtaining the additional content item information based the initial content item information comprises:

accessing a web resource indicated by the subscription feed as including or corresponding to the content item; and extracting natural language text from the web resource corresponding to the content item.

6. The system of claim 4, wherein the information sub-types comprise at least some sub-types selected from title, author(s), author affiliations, key words, abstract, description, core text, Digital Object Identifier (DOI), source, and date of publication.

7. The system of claim 4, wherein the structured dataset comprises a plurality of content item records, training of a natural language processing model further comprising:

labeling at least some content item records to seed training data with the at least some content item records; and forming a training set and a validation set comprising respective portions of the at least some seeded content item records.

8. The system of claim 7, further comprising:

evaluating a result of training a natural language processing model based on an accuracy of topic of interest identification among the portion of the at least some seeded content item records having labels within the validation set;

selecting at least some new content item records to the training data, wherein the at least some new content item records are labeled by the natural language processing model;

forming a second training set and a second validation set comprising respective portions of the at least some seeded content item records and respective portions of the at least some new content item records; and re-training the natural language processing model based on the second training set.

9. The system of claim 1, wherein detecting, in association with at least one information sub-type populated for the content item record, a chunk of natural language text associated with value indicative of a score of the detected chunk of natural language text relative to other possible chunks of natural language text having respectively associated values for the information sub-type comprises:

obtaining, for an information sub-type, one or more of utilization statistics, social media statistics, author statistics, and affiliation statistics; and obtaining, for another information sub-type, one or more of research statistics related to the source, source rank, institution rank, and scientific journal rank.

10. The system of claim 1, wherein detecting, in association with at least one information sub-type populated for the content item record, a chunk of natural language text associated with value indicative of a score of the detected chunk of natural language text relative to other possible chunks of natural language text having respectively associated values for the information sub-type comprises:

obtaining, for each of at least four different information sub-types, at least one of:
utilization statistics,
social media statistics,
author statistics,
affiliation statistics,
research statistics related to the source,
source rank, institution rank, and
scientific journal rank.

11. A computer-implemented method comprising the steps of claim 1.

12. A non-transitory computer-readable medium storing computer program instructions that when executed by one or more processors effectuate the steps of claim 1.

13. A computer-implemented method for generating topic-relevant notifications, the method comprising:

obtaining training data comprising at least some training records of content items comprising natural language text and topics of interest, wherein:

each training content item record associated with at least one topic and at least some portions of natural language text within different information sub-types of the training content item record being associated with the at least one topic; and each of the topics of interest are associated with a plurality of other portions of natural language text;

training on the training data, with one or more natural language processing algorithms, to generate a natural language processing model configured to provide an output indicative of whether a topic relates to an input content item record based on portions of natural language text for different information sub-types within the input content item record;

obtaining a plurality of input content item records based on respective content item information ingested from at least one source of content item information;

processing, with the natural language processing model, the plurality of input content item records to determine, for each input content item record, a score for at least one topic based on natural language text obtained from ingested content item information for different information sub-types of the content item record;

selecting a subset of the input content item records that have a same determined topic responsive to the determined scores;

determining, for each of the input content item records in the subset, a score indicative of predicted impact on the topic of interest, wherein determining a score indicative of a predicated impact of an input content item record on the topic comprises:

detecting, for at least some information sub-types having respective information within the input content item record, at least one key respectively associated with at least one value, scoring each key detected for an information sub-type based on the at least one respectively associated value based on values of other keys associated with the information sub-type in other records within the subset, and determining the score indicative of the predicted impact of the input content item record based on a weighted combination of the scores for the detected keys and the determined score for the topic for the input content item record;

selecting one or more input content item records from the subset of input content item records based on their respective rank within the subset in accordance with their respective scores indicative of predicted impact on the topic; and transmitting a notification based on the one or more selected input content items to client devices of user-subscribers to the topic.

14. The method of claim 13, comprising:
steps for training a machine learning model to determine topic scores for content item.

15. The method of claim 13, comprising:
steps for training a machine learning model to determine impact scores content items.

16. The method of claim 13, comprising:
steps for iteratively training a machine learning model to determine topic scores for content item.

17. The method of claim 13, comprising:
steps for iteratively training a machine learning model to determine impact scores content items.

18. The method of claim 13, comprising:
iteratively training one or more models based in part on notification feedback, wherein a content item in the one or more selected input content items is identified as, or selected for, a new training records based on respective notification feedback.

19. The method of claim 13, comprising constructing a content item record, wherein constructing a content item record comprises:

specifying a schema of a structured dataset of information sub-types for constructing content item records; and training a natural language processing model to parse obtained content item information having textual information in a plurality of other schemas based on identification of a correspondence of different portions natural language text within the content item information to respective information sub-types.

20. The method of claim 19, wherein obtaining content item information for the content item comprises:

obtaining initial content item information from a subscription feed; and obtaining additional content item information based the initial content item information comprises:

accessing a web resource indicated by the subscription feed as including or corresponding to the content item; and extracting natural language text from the web resource corresponding to the content item.

21. The method of claim 19, wherein the information sub-types comprise at least some sub-types selected from title, author(s), author affiliations, key words, abstract, description, core text, Digital Object Identifier (DOI), source, and date of publication.

22. The method of claim 19, wherein the structured dataset comprises a plurality of content item records, training of a natural language processing model further comprising:

labeling at least some content item records to seed training data with the at least some content item records; and forming a training set and a validation set comprising respective portions of the at least some seeded content item records.

23. The method of claim 22, further comprising:

evaluating a result of training a natural language processing model based on an accuracy of topic of interest identification among the portion of the at least some seeded content item records having labels within the validation set;

selecting at least some new content item records to the training data, wherein the at least some new content item records are labeled by the natural language processing model;

forming a second training set and a second validation set comprising respective portions of the at least some seeded content item records and respective portions of the at least some new content item records; and re-training the natural language processing model based on the second training set.

24. A system comprising one or processors and a non-transitory computer-readable medium storing computer-program instructions that when executed by the one or more processors effectuate operations corresponding to the steps of claim 13.

25. A non-transitory computer-readable medium storing computer program instructions that when executed by one or more processors effectuate the steps of claim 13.

* * * * *